United States Patent
Tang et al.

(10) Patent No.: US 12,443,522 B2
(45) Date of Patent: Oct. 14, 2025

(54) MEMORY DEVICE AND OPERATING METHOD THEREOF, MEMORY SYSTEM AND OPERATING METHOD THEREOF

(71) Applicant: YANGTZE MEMORY TECHNOLOGIES CO., LTD., Wuhan (CN)

(72) Inventors: Xingwei Tang, Wuhan (CN); Guangchang Ye, Wuhan (CN); Lu Guo, Wuhan (CN)

(73) Assignee: YANGTZE MEMORY TECHNOLOGIES CO., LTD., Wuhan (CN)

( * ) Notice: Subject to any disclaimer, the term of this patent is extended or adjusted under 35 U.S.C. 154(b) by 0 days.

(21) Appl. No.: 18/595,864

(22) Filed: Mar. 5, 2024

(65) Prior Publication Data
US 2025/0147878 A1    May 8, 2025

Related U.S. Application Data

(63) Continuation of application No. PCT/CN2023/130023, filed on Nov. 6, 2023.

(51) Int. Cl.
    *G06F 12/02* (2006.01)
(52) U.S. Cl.
    CPC ............... *G06F 12/0246* (2013.01)
(58) Field of Classification Search
    CPC ............................................. G06F 12/0246
    See application file for complete search history.

(56) References Cited

U.S. PATENT DOCUMENTS

| | | |
|---|---|---|
| 11,244,732 B2 | 2/2022 | Sharon et al. |
| 2015/0095741 A1* | 4/2015 | Lin ............ G06F 11/1048 714/773 |
| 2018/0173447 A1* | 6/2018 | Chin ............ G06F 3/0619 |
| 2019/0198069 A1* | 6/2019 | Kale ............ G11C 29/36 |
| 2022/0076738 A1* | 3/2022 | Bazarsky ........ G11C 11/5628 |
| 2022/0230697 A1* | 7/2022 | Di Vincenzo ...... G11C 29/52 |
| 2024/0194283 A1* | 6/2024 | Chen ............ G11C 29/021 |

FOREIGN PATENT DOCUMENTS

| | | |
|---|---|---|
| CN | 106158039 A | 11/2016 |
| CN | 112988613 A | 6/2021 |
| CN | 116246681 A | 6/2023 |
| CN | 116825167 A | 9/2023 |

* cited by examiner

*Primary Examiner* — Prasith Thammavong
(74) *Attorney, Agent, or Firm* — BAYES PLLC

(57) ABSTRACT

Examples of the present application disclose a memory device and operating method thereof, a memory system and operating method thereof, wherein the memory device includes: an array of memory cells; peripheral circuit coupled to the array of memory cells and configured to: obtain the first state corresponding to at least one code word formed by a preset number of memory cells at the target read voltage; perform multiple adjustments to the target read voltage, and obtain a first state corresponding to the at least one of the code words at the read voltage after each of the adjustments respectively; determine a valley voltage in accordance with a variation trend of the relationship of size between the number of flipped bits and the first preset value indicated by a plurality of the obtained first states.

20 Claims, 18 Drawing Sheets obtaining a first state corresponding to the at least one of the code words at a target read voltage; the first state including a state which is to represent a relationship of size between the number of bits in the at least one of the code words which are flipped in two results of reading at the first read voltage and the second read voltage and a first preset value; the difference between the first read voltage and the second read voltage being less than a preset voltage ~ S10 performing multiple adjustments to the target read voltage, and obtaining a first state corresponding to the at least one of the code words at the read voltage after each of the adjustments respectively ~ S20 determining a valley voltage in accordance with a variation trend of the relationship of size between the number of flipped bits and the first preset value indicated by a plurality of the obtained first states; the valley voltage is to be a read voltage for performing a read operation on the at least one of the code words ~ S30

FIG. 7

MEMORY DEVICE AND OPERATING METHOD THEREOF, MEMORY SYSTEM AND OPERATING METHOD THEREOF

CROSS-REFERENCE TO RELATED APPLICATIONS

This application is a continuation of International Application No. PCT/CN2023/130023, filed on Nov. 6, 2023, the content of which is incorporated herein by reference in its entirety.

FIELD OF TECHNOLOGY

The present application relates but is not limited to a memory device and operating method thereof, a memory system and operating method thereof.

BACKGROUND

With the development of science and technology, the market size of the integrated circuit industry is getting larger and larger, and the process and technology for a non-volatile memory device in the entire integrated circuit industry have experienced rapid development in recent years, wherein NAND memory is particularly widely used. NAND memory implements a function of data storage through capturing and storing charges in the gate dielectric layers of the memory cells included in the NAND memory. However, with the use increasing over time, the charge stored in the memory cell may change due to the increase of the use time, repeated read operations, cross temperature, etc., therefore affecting the accuracy of reading data stored in the memory cell.

SUMMARY

According to one aspect of the present disclosure, a memory device is provided. The memory device may include an array of memory cells, including a plurality of memory cells. A preset number of the memory cells may form a code word. The memory device may include a peripheral circuit coupled to the array of memory cells. The peripheral circuit may be configured to obtain a first state corresponding to at least one of the code words at a target read voltage. The first state may include a state that represents a relationship of size between a number of bits in the at least one of the code words which are flipped in two results of reading at a first read voltage and a second read voltage and a first preset value. A difference between the first read voltage and the second read voltage may be less than a preset voltage. The peripheral circuit may be configured to perform multiple adjustments to the target read voltage, and obtain a first state corresponding to the at least one of the code words at the read voltage after each of the adjustments respectively. The peripheral circuit may be configured to determine a valley voltage in accordance with a variation trend of the relationship of size between the number of flipped bits and the first preset value indicated by a plurality of the obtained first states. The valley voltage may be a read voltage for performing a read operation on the at least one of the code words.

In some implementations, the peripheral circuit may be configured to read data stored in at least one of the code words at the target read voltage to obtain a first result. In some implementations, the peripheral circuit may be configured to perform a first adjustment to the target read voltage and read data stored in at least one of the code words at the adjusted target read voltage to obtain a second result. In some implementations, the peripheral circuit may be configured to perform a logical operation on the first result and the second result to obtain a third result. In some implementations, the peripheral circuit may be configured to compare the number of bits in the third result that represents flip of bits in the second result relative to the first result and the first preset value to obtain the first state.

In some implementations, the peripheral circuit may include a first latch configured to store the first result. In some implementations, the peripheral circuit may include a second latch configured to store the second result. In some implementations, the peripheral circuit may include a third latch configured to store the third result.

In some implementations, when the number of bits in the third result that represent flip of bits in the second result relative to the first result is greater than the first preset value, the first state is a failed state. In some implementations, when the number of bits in the third result that represents flip of bits in the second result relative to the first result is less than or equal to the first preset value, the first state is a pass state.

In some implementations, the peripheral circuit may be configured to, when multiple adjustments are performed to the target read voltage, perform a second adjustment to the read voltage after a previous adjustment for each of the multiple adjustments. In some implementations, a step size of the second adjustment may be greater than that of the first adjustment; and wherein the step size of the second adjustment is a fixed value.

In some implementations, the peripheral circuit may be configured to, when multiple adjustments are performed to the target read voltage, if a change from a failed state to at least one pass state and then to a failed state again is indicated by a plurality of the first states corresponding to the read voltages after multiple adjustments, stop adjusting the read voltage.

In some implementations, when the number of pass states between the failed states at two ends indicated by the plurality of first states corresponding to the adjusted read voltages include one, the adjusted read voltage corresponding to the one pass state is the valley voltage. In some implementations, when the number of pass states between the failed states at two ends indicated by the plurality of first states corresponding to the adjusted read voltages include more than one, the adjusted read voltage corresponding to one pass state at a middle position among the more than one pass states is the valley voltage.

In some implementations, when the number of pass states between the failed states at two ends indicated by the plurality of first states corresponding to the adjusted read voltages includes an even number, the average of the adjusted read voltages corresponding to two pass states at a middle position among the plurality of the pass states is the valley voltage.

In some implementations, the peripheral circuit may be configured to after a first pass state after failed states occurs among the plurality of first states corresponding to the read voltages after multiple adjustments, perform a third adjustment to the read voltage after a previous adjustment. In some implementations, the step size of the third adjustment may be less than that of the second adjustment.

In some implementations, the peripheral circuit may be configured to maintain the third adjustment until a first failed state after pass states occurs among the plurality of first states. In some implementations, the peripheral circuit may be configured to, after the first failed state after pass states occurs among the plurality of first states, perform the second adjustment to the read voltage after a previous adjustment.

In some implementations, the peripheral circuit may be configured to, after a first pass state after failed states occurs among the plurality of first states corresponding to the read voltages after multiple adjustments, perform a fourth adjustment to the read voltage after a previous adjustment in accordance with the third result corresponding to the first pass state.

In some implementations, the peripheral circuit may be configured to, when the plurality of first states corresponding to the read voltages after multiple adjustments are all failed states, increase the step size corresponding to the second adjustment. In some implementations, the peripheral circuit may be configured to, when an increased step size of the second adjustment exceeds a second preset value, adjust the number of memory cells corresponding to at least one of the code words. In some implementations, the number of memory cells corresponding to the code word after adjustment may be less than the number of memory cells corresponding to the code word before adjustment.

In some implementations, the peripheral circuit may be configured to obtain the first preset value. In some implementations, the first preset value may be obtained in accordance with historical data and less than an upper limit of a fail bit count supported by the memory device.

In some implementations, the peripheral circuit may be configured to, before obtaining the first state corresponding to at least one of the code words at the target read voltage, set a read mode of the memory device to a single level read mode. In some implementations, the single level read mode may include reading at least one bit of the storage data stored in the memory cell with read voltages at one level.

In some implementations, the memory cell may include M bits, the memory device includes M-type pages, and the memory cell with M bits may read its M bits of storage data with read voltages at N levels. In some implementations, the M and N both may be integers greater than 1, and $N=2^M-1$. In some implementations, the peripheral circuit may be configured to, for read voltages at each level of the read voltages at multiple levels corresponding to each type of page, determine the valley voltage at each level in accordance with the plurality of first states corresponding to multiple read voltages at each level.

According to another aspect of the present disclosure, a memory system is provided. The memory system may include one or more memory devices. The one or more memory devices may include an array of memory cells. The array of memory cells may include a plurality of memory cells. A preset number of the memory cells forms a code word. The memory system may include peripheral circuit coupled to the array of memory cells. The peripheral circuit may be configured to obtain a first state corresponding to at least one of the code words at a target read voltage. The first state may include a state that represents a relationship of size between a number of bits in the at least one of the code words which are flipped in two results of reading at a first read voltage and a second read voltage and a first preset value. A difference between the first read voltage and the second read voltage may be less than a preset voltage. The peripheral circuit may be configured to perform multiple adjustments to the target read voltage, and obtain a first state corresponding to the at least one of the code words at the read voltage after each of the adjustments respectively. The peripheral circuit may be configured to determine a valley voltage in accordance with a variation trend of the relationship of size between the number of flipped bits and the first preset value indicated by a plurality of the obtained first states. The valley voltage may be a read voltage for performing a read operation on the at least one of the code words. The memory system may include a memory controller coupled to the memory device and controlling the memory device.

In some implementations, the memory controller may be configured to send a first instruction before performing a read operation on data stored in the memory device. In some implementations, the first instruction may indicate to obtain a valley voltage. In some implementations, the memory device may be configured to receive the first instruction, and obtain a valley voltage. In some implementations, the memory device may be configured to send the obtained valley voltage to the memory controller. In some implementations, the memory controller may be further configured to perform a read operation on data stored in the memory device with the valley voltage. In some implementations, the memory controller may be further configured to perform an error correction code decoding operation on a read result of the read operation.

According to a further aspect of the present disclosure, a memory system is provided. The memory system may include at least one memory device including a plurality of memory cells. A preset number of the memory cells may form a code word. The memory system may include a memory controller coupled to the at least one memory device. The memory controller may be configured to obtain a first state corresponding to at least one of the code words at a target read voltage. The first state may include a state that represents a relationship of size between a number of bits in the at least one of the code words which are flipped in two results of reading at the first read voltage and the second read voltage and a first preset value. A difference between the first read voltage and the second read voltage may be less than a preset voltage. The memory controller may be configured to perform multiple adjustments to the target read voltage, and obtain a first state corresponding to the at least one of the code words at the read voltage after each of the adjustments respectively. The memory controller may be configured to determine a valley voltage in accordance with a variation trend of the relationship of size between the number of flipped bits and the first preset value indicated by a plurality of the obtained first states. The valley voltage may be a read voltage for performing a read operation on the at least one of the code words.

In some implementations, the memory controller may be configured to send a second instruction before performing a read operation on data stored in the memory device. In some implementations, the second instruction may indicate to obtain a plurality of first states corresponding to at least one of the code words at multiple different read voltages. In some implementations, the memory device may be configured to receive the second instruction. In some implementations, the memory device may be configured to obtain a plurality of first states corresponding to at least one of the code words at multiple different read voltages. In some implementations, the memory device may be configured to send the obtained first states to the memory controller. In some implementations, the memory controller may be further configured to determine a valley voltage with the plurality of first states respectively corresponding to multiple different read voltages. In some implementations, the memory controller may be further configured to perform a read operation on data stored in the memory device with the valley voltage.

In some implementations, the memory device may be configured to read data stored in at least one of the code words at the target read voltage to obtain a first result. In some implementations, the memory device may be configured to perform a first adjustment to the target read voltage and read data stored in at least one of the code words at the adjusted target read voltage to obtain a second result. In some implementations, the memory device may be configured to perform a logical operation on the first result and the second result to obtain a third result. In some implementations, the memory device may be configured to compare the number of bits in the third result that represent flip of bits in the second result relative to the first result and the first preset value to obtain the first state.

In some implementations, the data amount of the first state may be less than a preset threshold of data amount.

According to still another aspect of the present disclosure, a method for operating a memory device is provided. The method may include obtaining a first state corresponding to at least one code word at a target read voltage. The first state may include a state that represents a relationship of size between a number of bits in the at least one of the code words which are flipped in two results of reading at a first read voltage and a second read voltage and a first preset value. A difference between the first read voltage and the second read voltage may be less than a preset voltage. The memory device may include an array of memory cells. The array of memory cells may include a plurality of memory cells. A preset number of the memory cells may form a code word. The method may include performing multiple adjustments to the target read voltage, and obtaining a first state corresponding to the at least one of the code words at the read voltage after each of the adjustments respectively. The method may include determining a valley voltage in accordance with a variation trend of the relationship of size between the number of flipped bits and the first preset value indicated by a plurality of the obtained first states. The valley voltage may be to be a read voltage for performing a read operation on the at least one of the code words.

In some implementations, the obtaining the first state corresponding to at least one code word at the target read voltage may include reading data stored in at least one of the code words at the target read voltage to obtain a first result. In some implementations, the obtaining the first state corresponding to at least one code word at the target read voltage may include performing a first adjustment to the target read voltage and reading data stored in at least one of the code words at the adjusted target read voltage to obtain a second result. In some implementations, the obtaining the first state corresponding to at least one code word at the target read voltage may include performing a logical operation on the first result and the second result to obtain a third result. In some implementations, the obtaining the first state corresponding to at least one code word at the target read voltage may include comparing the number of bits in the third result that represent flip of bits in the second result relative to the first result and the first preset value to obtain the first state.

In some implementations, the method may include storing the first result in a first latch of the memory device. In some implementations, the method may include storing the second result in a second latch of the memory device. In some implementations, the method may include storing the third result in a third latch of the memory device.

In some implementations, when the number of bits in the third result that represent flip of bits in the second result relative to the first result is greater than the first preset value, the first state is a failed state. In some implementations, when the number of bits in the third result that represents flip of bits in the second result relative to the first result is less than or equal to the first preset value, the first state is a pass state.

In some implementations, when multiple adjustments are performed to the target read voltage, performing a second adjustment to the read voltage after a previous adjustment for each of the multiple adjustments. In some implementations, the step size of the second adjustment may be greater than that of the first adjustment. In some implementations, the step size of the second adjustment may be a fixed value.

In some implementations, when multiple adjustments are performed to the target read voltage, if a change from a failed state to at least one pass state and then to a failed state again is indicated by a plurality of first states corresponding to the read voltages after multiple adjustments, stopping adjusting the read voltage.

In some implementations, when the number of the pass states between the failed states at two ends indicated by the plurality of first states corresponding to the adjusted read voltages include one, the adjusted read voltage corresponding to the one pass state is the valley voltage. In some implementations, when the number of the pass states between the failed states at two ends indicated by the plurality of first states corresponding to the adjusted read voltages include more than one, the adjusted read voltage corresponding to the one pass state at a middle position among the more than one pass states is the valley voltage.

In some implementations, when the number of the pass states between the failed states at two ends indicated by the plurality of first states corresponding to the adjusted read voltages include an even number, the average of the adjusted read voltages corresponding to two pass states at a middle position among a plurality of pass states is the valley voltage.

In some implementations, the method may include, after a first pass state after failed states occurs among the plurality of first states corresponding to the read voltages after multiple adjustments, performing a third adjustment to the read voltage after a previous adjustment. In some implementations, the step size of the third adjustment may be less than that of the second adjustment.

In some implementations, the method may include maintaining the third adjustment until a first failed state after pass states occurs among the plurality of first states. In some implementations, the method may include, after the first failed state after pass states occurs among the plurality of first states, performing the second adjustment to the read voltage after a previous adjustment.

In some implementations, the method may include, after a first pass state after failed states occurs among the plurality of first states corresponding to the read voltages after multiple adjustments, performing a fourth adjustment to the read voltage after a previous adjustment in accordance with the third result corresponding to the first pass state.

In some implementations, the method may include when the plurality of first states corresponding to the read voltages after multiple adjustments are all failed states, increasing the step size corresponding to the second adjustment. In some implementations, the method may include, when an increased step size of the second adjustment exceeds a second preset value, adjusting the number of memory cells corresponding to at least one of the code words, the number of memory cells corresponding to the code word after adjustment is less than the number of memory cells corresponding to the code word before adjustment.

In some implementations, the method may include obtaining the first preset value; wherein the first preset value is obtained in accordance with historical data and less than an upper limit of a fail bit count supported by the memory device.

In some implementations, the method may include, before obtaining the first state corresponding to at least one of the code words at the target read voltage, setting a read mode of the memory device to a single level read mode. In some implementations, the single level read mode may include reading at least one bit of the storage data stored in the memory cell with read voltages at one level.

In some implementations, the memory cell may include M bits, the memory device may include M-type pages, and the memory cell with M bits may read its M bits of storage data with read voltages at N levels. In some implementations, the M and N both may be integers greater than 1, and $N=2^M-1$. In some implementations, the method may include, for read voltages at each level of the read voltages at multiple levels corresponding to each type of page, determining the valley voltage at each level in accordance with the plurality of first states corresponding to multiple read voltages at each level.

According to still a further aspect of the present disclosure, a method for operating a memory system is provided. The method may include sending a first instruction before performing a read operation on data stored in a memory device of the memory system. The first instruction indicates to obtain a valley voltage which is obtained according to a method of obtaining a valley voltage. The method of obtaining a valley voltage may include obtaining a first state corresponding to at least one code word at a target read voltage. The first state may include a state that represents a relationship of size between a number of bits in the at least one of the code words which are flipped in two results of reading at a first read voltage and a second read voltage and a first preset value. A difference between the first read voltage and the second read voltage may be less than a preset voltage. The memory device may include an array of memory cells. The array of memory cells may include a plurality of memory cells. A preset number of the memory cells may form a code word. The method of obtaining a valley voltage may include performing multiple adjustments to the target read voltage, and obtaining a first state corresponding to the at least one of the code words at the read voltage after each of the adjustments respectively. The method of obtaining a valley voltage may include determining a valley voltage in accordance with a variation trend of the relationship of size between the number of flipped bits and the first preset value indicated by a plurality of the obtained first states. The valley voltage may be a read voltage for performing a read operation on the at least one of the code words. The method may include performing a read operation on data stored in the memory device with the valley voltage. The method may include performing an error correction code decoding operation on a read result of the read operation.

According to yet another aspect of the present disclosure, a method for operating a memory system. The method may include obtaining a first state corresponding to at least one code word at a target read voltage. The first state may include a state that represents a relationship of size between a number of bits in the at least one of the code words which are flipped in two results of reading at a first read voltage and a second read voltage and a first preset value. A difference between the first read voltage and the second read voltage is less than a preset voltage. The memory system may include at least one memory device. The memory device may include a plurality of memory cells. A preset number of the memory cells may form a code word. The method may include performing multiple adjustments to the target read voltage, and obtaining a first state corresponding to the at least one of the code words at the read voltage after each of the adjustments respectively. The method may include determining a valley voltage in accordance with a variation trend of the relationship of size between the number of flipped bits and the first preset value indicated by a plurality of the obtained first states. The valley voltage may include a read voltage for performing a read operation on the at least one of the code words.

In some implementations, the method may include sending a second instruction before performing a read operation on data stored in the memory device. In some implementations, the second instruction may indicate to obtain a plurality of first states corresponding to at least one of the code words at multiple different target read voltages. In some implementations, the method may include determining a valley voltage with a plurality of the first results respectively corresponding to multiple different read voltages. In some implementations, the method may include performing a read operation on data stored in the memory device with the valley voltage.

In some implementations, the method may include reading data stored in at least one of the code words at the target read voltage to obtain a first result. In some implementations, the method may include performing a first adjustment to the target read voltage and reading data stored in at least one of the code words at the adjusted target read voltage to obtain a second result. In some implementations, the method may include performing a logical operation on the first result and the second result to obtain a third result. In some implementations, the method may include comparing the number of bits in the third result that represent flip of bits in the second result relative to the first result and the first preset value to obtain the first state.

According to still a further aspect of the present disclosure, a memory device is provided. The memory device may include an array of memory cells, including a plurality of memory cells. A preset number of the memory cells may form a code word. The memory device may include a peripheral circuit coupled to the array of memory cells. The peripheral circuit may include a page buffer. The peripheral circuit may include control logic configured to read data stored in at least one of the code words at a first read voltage to obtain a first result, and store the first result in a first latch of the page buffer. The peripheral circuit may include control logic configured to adjust the first read voltage to obtain a second read voltage, read data stored in at least one of the code words at the second read voltage to obtain a second result, and store the second result in a second latch of the page buffer. A difference between the first read voltage and the second read voltage may be less than a preset voltage. The peripheral circuit may include control logic configured to perform a logical operation on the first result and the second result to obtain a third result, and store the third result in a third latch of the page buffer. The peripheral circuit may include control logic configured to compare the number of bits in the third result that represent flip of bits in the second result relative to the first result and a first preset value to obtain a first state. The first state includes a state which is to represent a relationship of size between a number of bits in the at least one of the code words which are flipped in two results of reading at the first read voltage and the second read voltage and the first preset value.

According to yet another aspect of the present disclosure, a method for operating a memory device is provided. The method may include reading data stored in at least one code word at a first read voltage to obtain a first result, and storing the first result in a first latch of a page buffer. The memory device may include an array of memory cells and a page buffer. The array of memory cells may include a plurality of memory cells. A preset number of the memory cells may form a code word. The method may include adjusting the first read voltage to obtain a second read voltage, reading data stored in at least one of the code words at the second read voltage to obtain a second result, and storing the second result in the second latch of the page buffer. A difference between the first read voltage and the second read voltage may be less than a preset voltage. The method may include performing a logical operation on the first result and the second result to obtain a third result, and storing the third result in the third latch of the page buffer. The method may include comparing the number of bits in the third result that represent flip of bits in the second result relative to the first result and a first preset value to obtain a first state. The first state may include a state which is to represent a relationship of size between a number of bits in the at least one of the code words which are flipped in two results of reading at the first read voltage and the second read voltage and the first preset value.

DETAILED DESCRIPTION

In the accompanying drawings, unless otherwise specified, same reference numbers refer to same or similar parts or elements throughout multiple accompanying drawings. The accompanying drawings are not necessarily to scale. It should be understood that these accompanying drawings depict only some examples disclosed in accordance with the present application and should not be considered as limiting the scope of the present application.

FIG. 1 is a schematic diagram of an example system including a memory system of an example according to the present application;

FIG. 2*a* is a schematic diagram of an example memory card including a memory system according to an example of the present application;

FIG. 2*b* is a schematic diagram of an example solid state drive including a memory system according to an example of the present application;

FIG. 3*a* is a schematic diagram of the distribution of memory cells of a three-dimensional NAND memory according to an example of the present application;

FIG. 3*b* is a schematic diagram of an example memory including peripheral circuits according to an example of the present application;

FIG. 7 is a schematic flowchart of an implementation of a method for operating a memory device provided by an example of the present application.

DETAILED DESCRIPTION

Figure 1:
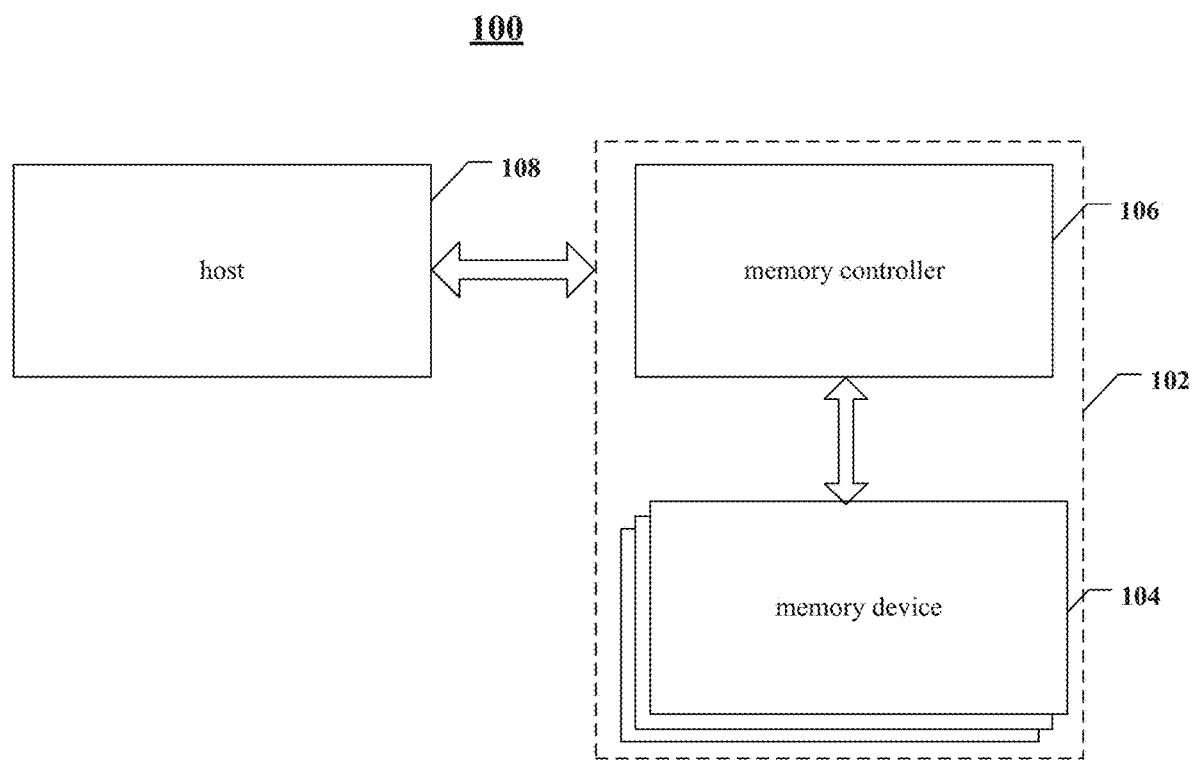

Example implementations disclosed in the present application will be described in more detail below with reference to the accompanying drawings. Although example implementations of the present application are shown in the accompanying drawings, it should be understood that the present application may be implemented in various forms and should not be limited to the specific implementations set forth herein. Rather, these examples are provided so that the present application can be more thoroughly understood and the scope of the present application can be fully conveyed to those skilled in the art.

In the following description, numerous specific details are given in order to provide a more thorough understanding of the present application. However, it will be apparent to one skilled in the art that the present application may be practiced without one or more of these details. In other examples, in order to avoid confusion with the present application, some technical features known in the art are not described; that is, not all features of the actual example are described here, and well-known functions and structures are not described in detail.

Furthermore, accompanying drawings are merely schematic illustrations of the present application and are not necessarily drawn to scale. Same reference numerals in the accompanying drawings represent same or similar parts, and thus repeated description thereof will be omitted. Some of the block diagrams shown in the accompanying drawings are functional entities and do not necessarily correspond to physically or logically separate entities. These functional entities may be implemented in software form, or implemented in one or more hardware modules or integrated circuits, or implemented in different networks and/or processor devices and/or microcontroller devices.

The flowcharts shown in the accompanying drawings are illustrative only and do not necessarily include all operations. For example, some operations may be decomposed, and some operations may be merged or partially merged, thus the actual order of execution may change according to the actual situation.

A term used herein is for the purpose of describing a particular example only and is not to be considered as limitation of the present application. As used herein, the singular forms "a", "an" and "said/the" are intended to include the plural forms as well, unless the context clearly dictates otherwise. It should also be understood that the terms "consists of" and/or "comprising", when used in this description, identify the presence of stated features, integers, operations, operations, elements and/or parts, but do not exclude the presence of one or more other features, integers, operations, operations, elements, parts and/or groups. As used herein, the term "and/or" includes any and all combinations of the associated listed items.

Memory devices in examples of the present application include but are not limited to a three-dimensional NAND memory, and for ease of understanding, a three-dimensional NAND memory is used as an example for illustration.

FIG. 1 illustrates a block diagram of an example system 100 with memory devices in accordance with some aspects of the present application. The system 100 may be a mobile phone, a desktop computer, a laptop computer, a tablet, a vehicle computer, a gaming console, a printer, a positioning device, a wearable electronic device, a smart sensor, a Virtual Reality (VR) device, an Augment Reality (AR) device, or any other suitable electronic devices having memory device therein. As shown in in FIG. 1, system 100 may include a host 108 and a memory system 102, and the memory system 102 has one or more memory devices 104 and a memory controller 106. The host 108 may be a processor of an electronic device (e.g., a Central Processing Unit (CPU)) or a System of Chip (SoC) (e.g., an Application Processor (AP)). Host 108 may be configured to send data to or receive data from memory device 104.

According to some implementations, memory controller 106 is coupled to memory device 104 and host 108 and is configured to control memory device 104. Memory controller 106 may manage data stored in memory device 104 and communicate with host 108. In some implementations, the memory controller 106 is designed to operate in low duty-cycle environments, e.g., Secure Digital (SD) card, Compact Flash (CF) card, Universal Serial Bus (USB) flash drive, or other media for use in electronic devices such as personal computer, digital camera, mobile phone, etc.

In some implementations, the memory controller 106 is designed to operate in high duty-cycle environment Solid State Drive (SSD) or Embedded Multi Media Card (eMMC), wherein SSD or eMMC is used as data storage for mobile devices such as smartphone, tablet computer, laptop computer, and enterprise storage array.

Memory controller 106 may be configured to control operations of memory device 104, e.g., read, erase and program operations. Memory controller 106 may also be configured to manage various functions related to data stored or to be stored in memory device 104, including but not limited to bad block management, garbage collection, logical-to-physical address translation, wear leveling, etc. In some implementations, memory controller 106 is also configured to process error correction code related to data read from or written to memory device 104.

The memory controller 106 may also perform any other suitable functions, e.g., formatting the memory device 104. Memory controller 106 may communicate with external devices (e.g., host 108) according to a particular communication protocol. For example, the memory controller 106 may communicate with external devices through at least one of various interface protocols, such as USB protocol, MMC protocol, Peripheral Component Interconnect (PCI) protocol, PCI Express (PCI-E) protocol, Advanced Technology Attachment (ATA) protocol, Serial ATA protocol, Parallel ATA protocol, Small Computer Small Interface (SCSI) protocol, Enhanced Small Disk Interface (ESDI) protocol, Integrated Drive Electronics (IDE) protocol, Firewire protocol, etc.

The memory controller 106 and one or more memory device(s) 104 may be integrated into various types of storage devices, e.g., included in the same package (e.g., Universal Flash Storage (UFS) package or eMMC package). That is, memory system 102 may be implemented and packaged into different types of end electronic products.

Figure 2A:
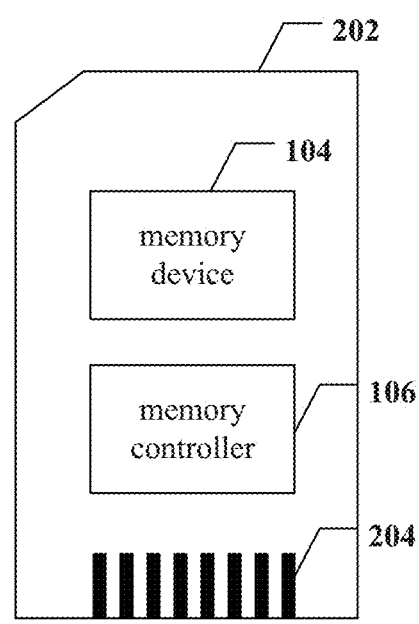

In one example as shown in FIG. 2a, memory controller 106 and a single memory device 104 may be integrated into a memory card 202. Memory card 202 may include a PC card (PCMCIA, personal computer memory card international association), a CF card, a smart media (SM) card, a memory stick, a multimedia card (MMC, RS-MMC, MMC-micro), an SD card (SD, miniSD, microSD, SDHC), a UFS, etc. Memory card 202 may further include a memory card connector 24 coupling memory card 202 with a host (e.g., host 108 in FIG. 1).

Figure 2B:
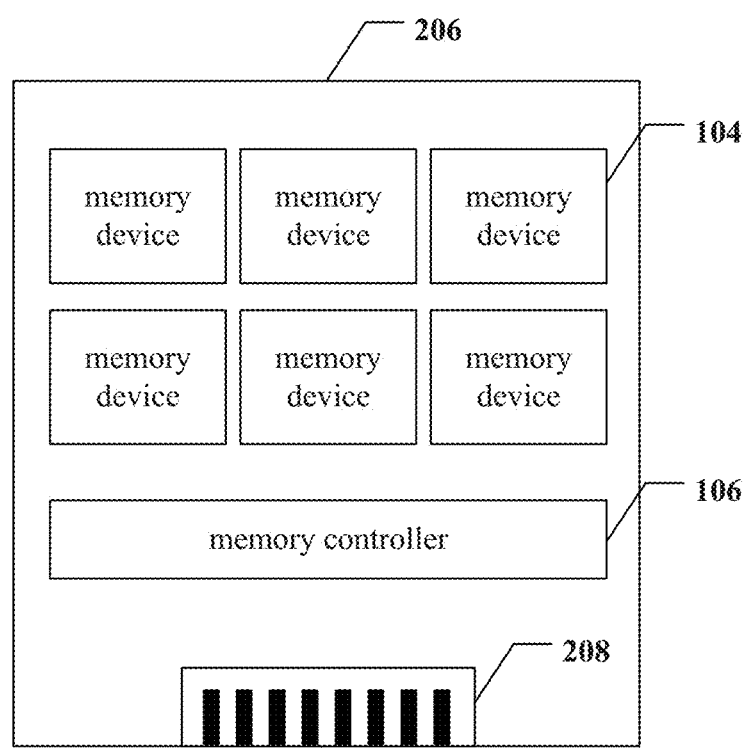

In another example as shown in FIG. 2b, memory controller 106 and multiple memory devices 104 may be integrated into a SSD 206. SSD 206 may further include an SSD connector 208 coupling the SSD 206 with a host (e.g., host 108 in FIG. 1). In some implementations, at least one of the storage capacity or operating speed of SSD 206 is greater than at least one of the storage capacity or operating speed of memory card 202.

Figure 3A:
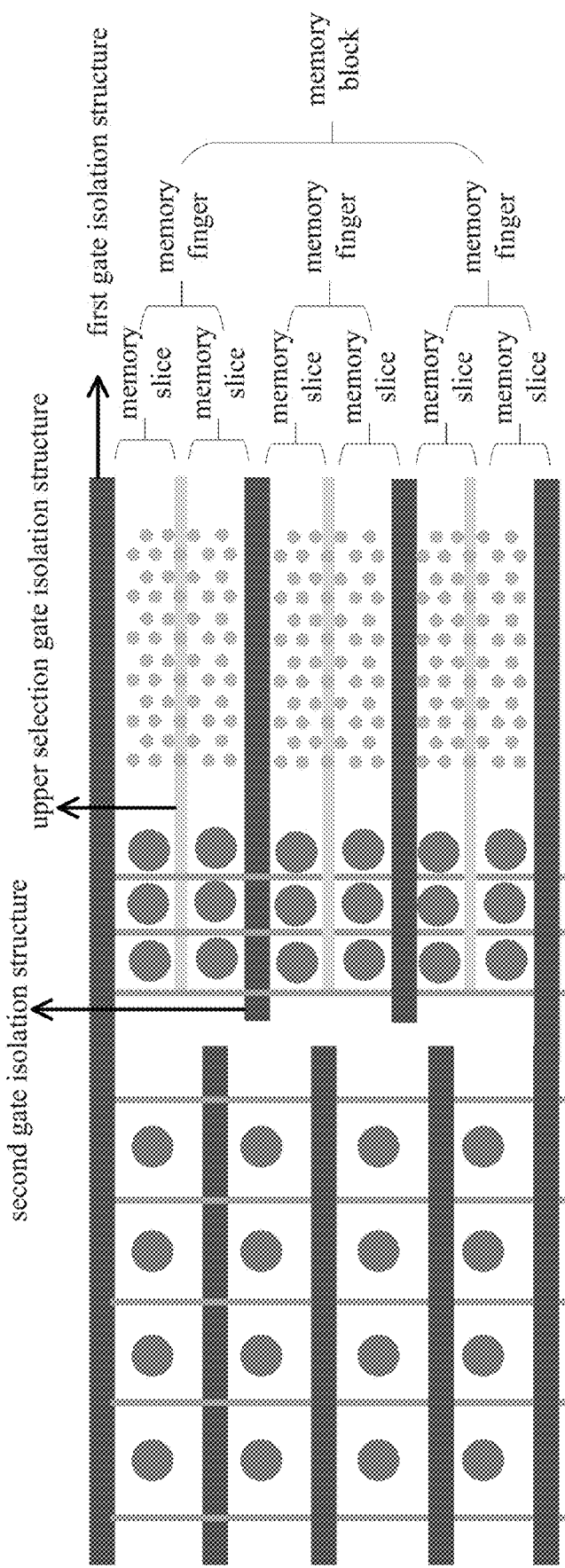

In one example, FIG. 3a provides a schematic structure diagram of an array of memory cells of a three-dimensional NAND memory, and as shown in FIG. 3a, the array of memory cells of the three-dimensional NAND memory is composed of several rows of memory cell rows parallel to the gate isolation structure and staggered in parallel, every two memory cell rows are separated by a gate isolation structure and an upper selection gate isolation structure, and each memory cell row includes a plurality of memory cells. The gate isolation structure may include a first gate isolation structure and a second gate isolation structure; the first gate isolation structure divides the array of memory cells into multiple blocks; multiple second gate isolation structures divide a block into multiple memory fingers; an upper selection gate isolation structure provided in the middle of each memory finger may divide the memory finger into two parts, thereby dividing the memory finger into two memory slices. A memory block shown in FIG. 3a includes 6 memory slices, and in practical applications, the number of memory slices in a memory block is not limited to this.

In some examples, multiple word lines may be coupled to each block. A plurality of memory cells coupled to each individually controlled word line form a page, e.g., all memory cells in each memory slice in FIG. 3a are coupled to form a page.

It should be noted that the number of memory cell rows between the gate isolation structure and the upper selection gate isolation structure shown in FIG. 3a is provided by way of example and not limitation, and is not used to limit the number of memory cell rows included in a memory finger of the three-dimensional NAND memory in the present application. In practical applications, the number of memory cell rows included in a memory finger may be adjusted according to actual conditions, such as 2, 4, 8, 16, etc.

Figure 3B:
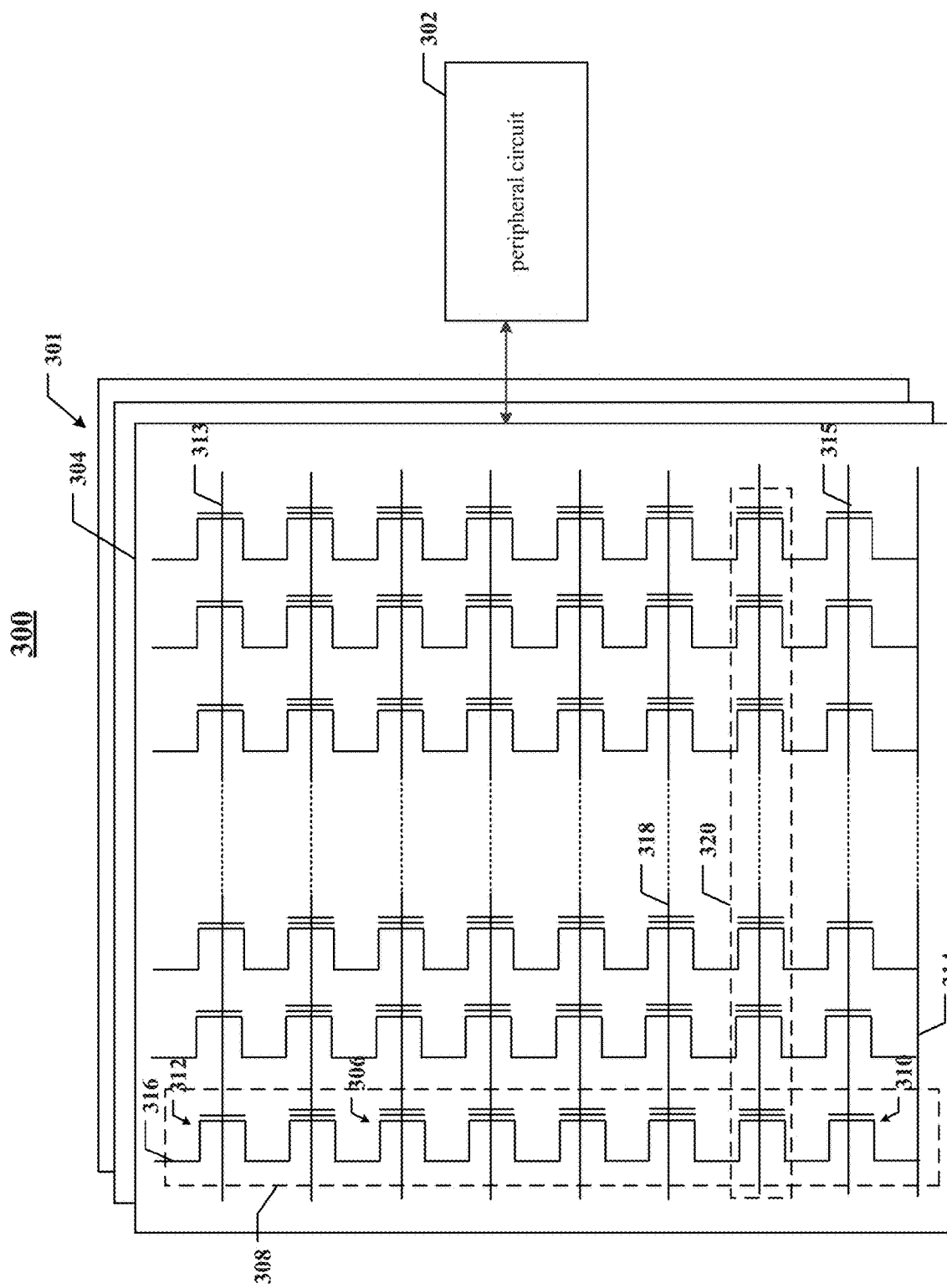

FIG. 3b illustrates a schematic circuit diagram of an example memory device 300 including peripheral circuitry according to some aspects of the present application.

Memory device 300 may be an example of memory device 104 in FIG. 1. The memory device 300 may include an array of memory cells 301 and a peripheral circuit 302 coupled to the array of memory cells 301. Taking array of memory cells 301 as a three-dimensional NAND memory cell array as an example for illustration, memory cells 306 is a NAND-type memory cell, and memory cells 306 are provided in the form of an array of memory strings 308, and each memory string 308 extends vertically over a substrate (not shown). In some implementations, each memory string 308 includes a plurality of memory cells 306 coupled in series and stacked vertically. Each memory cell 306 may retain a continuous analog value, e.g., voltage or charge, depending on the number of electrons trapped within the area of the memory cell 306. Each memory cell 306 may be a "floating gate" type memory cell including a floating gate transistor, or a "charge trap" type memory cell including a charge trap transistor.

In some implementations, each memory cell 306 is a Single-level Cell (SLC) that has two possible storage states and may thus store one bit of data. For example, a first storage state of "0" may correspond to a first voltage range, and a second storage state of "1" may correspond to a second voltage range. In some implementations, each memory cell 306 is a Multi-Level Cell (MLC) capable of storing more than a single bit of data in more than four storage states. For example, an MLC may store two bits per cell (also known as a Double-Level Cell), three bits per cell (also known as a Trinary-Level Cell (TLC)), four bits per cell (also known as a Quad-Level Cell (QLC)), five bits per cell (also known as a Penta-level cell (PLC)), or more than five bits per cell. Each MLC can be programmed to assume a range of possible nominal storage values. In one example, if each MLC stores two bits of data, the MLC can be programmed to assume one of three possible programming levels from the erased state through writing one of three possible nominal storage values into the cell, a fourth nominal storage value may be used for the erase state.

It should be noted that the storage state mentioned here is also the storage state of the memory cell mentioned in this application. Different memory cells have different numbers of storage states, e.g., a SLC type memory cell has 2 storage states (e.g., two memory states), wherein the 2 storage states include a programming state and an erase state. As another example, an MLC type memory cell has 4 storage states, wherein the four storage states include one erase state and three programming states. As yet another example, a TLC type memory cell has 8 storage states, where the 8 storage states include one erase state and seven programming states. In some implementations, the QLC-type memory cell has 16 storage states, where the 16 storage states include one erase state and fifteen programming states.

As shown in FIG. 3b, each memory string 308 may include a bottom-select gate (BSG) 310 (also referred to as a source side select gate) at its source terminal and a top-select gate (TSG) 312 (also referred to as a drain-side-select gate) at its drain terminal. BSG 310 and TSG 312 may be configured to activate the selected memory cell string 308 during read operation and program operation. In some implementations, the sources of memory strings 308 in a same memory block 304 are coupled through a same source line (SL) 314 (e.g., a common SL). In other words, according to some implementations, all memory strings 308 in a same memory block 304 have an array-common source (ACS). According to some implementations, TSG 312 of each memory string 308 is coupled to a corresponding bit line (BL) 316 from which data may be read or written via an output bus (not shown). In some implementations, each memory string 308 is configured to be selected or deselected through at least one of applying a select voltage (e.g., above the threshold voltage of a transistor with a TSG 312) or a deselect voltage (e.g., 0V) to the corresponding TSG 312 via one or more TSG lines 313 or applying a select voltage (e.g., above the threshold voltage of a transistor with a BSG 310) or a deselect voltage (e.g., 0V) to the corresponding BSG 310 via one or more BSG lines 315.

As also shown in FIG. 3b, a memory string 308 may be organized into multiple memory blocks 304 each of which may have a common source line 314 (e.g., coupled to ground). In some implementations, each memory block 304 is the basic data unit for an erase operation, e.g., all memory cells 306 on the same memory block 304 are erased simultaneously. To erase the memory cell 306 in the selected memory block 304, the source line 314 coupled to the selected memory block 304 and to the unselected memory blocks 304 in the same plane as the selected memory block 304 may be biased with an erase voltage (Vers) (e.g., a high positive voltage (e.g., 20V or higher)). It should be understood that, in some examples, erase operations may be performed at the half-memory block level, at the quarter-memory block level, or at a level with any suitable number of memory blocks or any suitable fraction of memory blocks. The memory cells 306 of adjacent memory strings 308 may be coupled through a word line 318 that selects which row of memory cells 306 is affected by read and program operations. In some implementations, combined with the above FIG. 3a, a plurality of memory cells are isolated by an upper selection gate isolation structure and a gate isolation structure, and a plurality of memory cells between the upper selection gate isolation structure and the gate isolation structure are arranged into multiple memory cell rows, and each memory cell row is parallel to the gate isolation structure and the upper selection gate isolation structure. The memory cells in the memory slice that share a same word line form a physical page 320; each physical page 320 may be mapped to at least one logical page according to the storage mode of the corresponding memory cell 306 (e.g., SLC or MLC as mentioned above); and a logical page may form the basic data unit for program operation and read operation.

Referring to FIGS. 3a and 3b, each memory cell 306 of the plurality of memory cells is coupled to a corresponding word line 318, and each memory string 308 is coupled to a corresponding bit line 316 through a corresponding select transistor (e.g., top-select transistor (TSG) 312).

Figure 4:
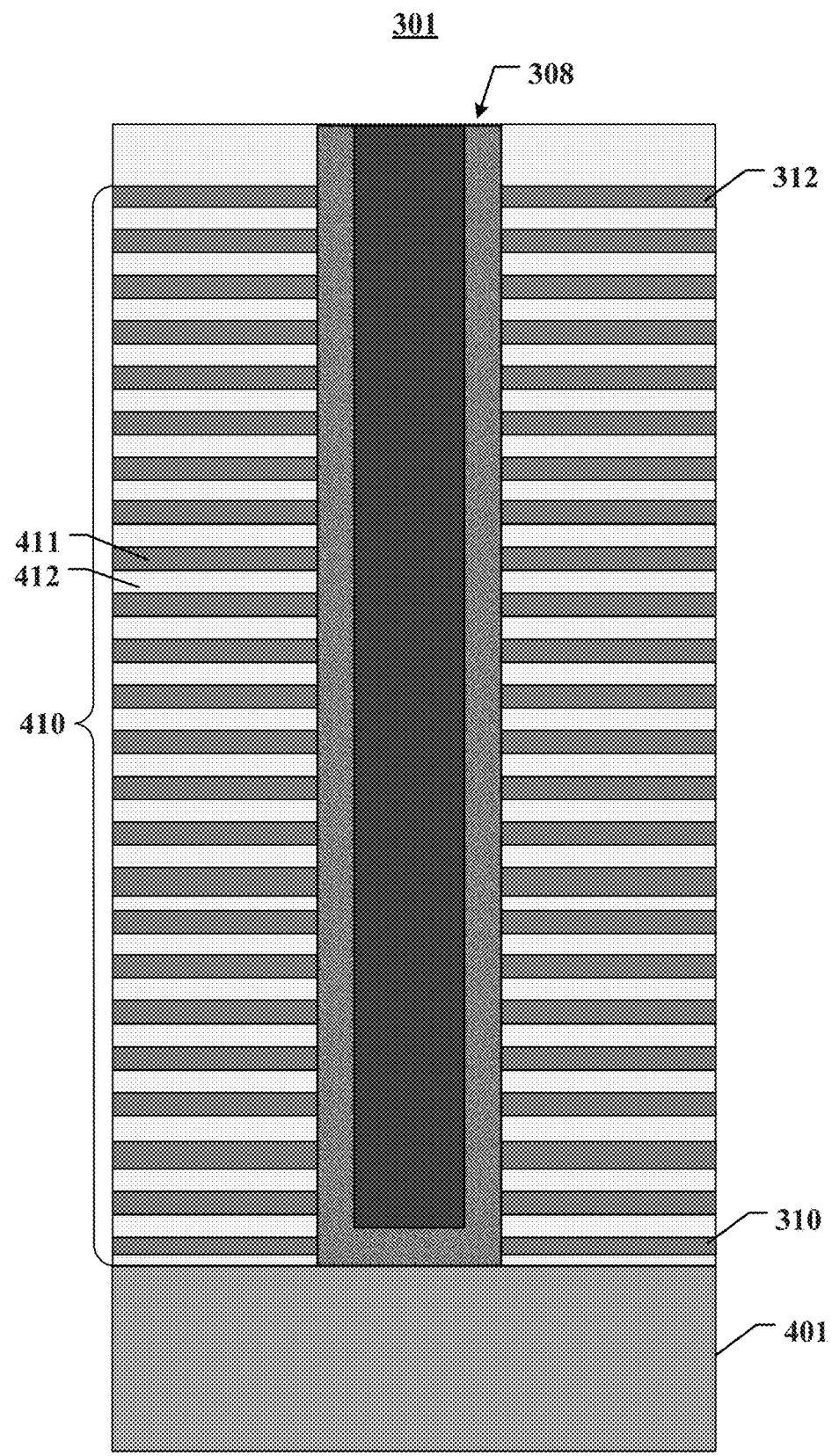
FIG. 4 is a schematic cross-sectional view of an array of memory cells including NAND-type memory strings according to an example of the present application.

FIG. 4 illustrates a schematic cross-sectional view of an example of array of memory cells 301 including memory strings 308, e.g., NAND, according to some aspects of the present application. As shown in FIG. 4, the array of memory cells 301 may include a stacked structure 410, the stacked structure 410 includes multiple gate layers 411 and multiple insulating layers 412 alternately stacked in sequence, and the channel structure vertically penetrating through the gate layers 411 and the insulating layers 412. The channel structure may be coupled to each gate layer to form a memory cell, and the channel structure may be coupled to multiple gate layers in the stacked structure 410 to form the memory string 308. Gate layers 411 and the insulating layers 412 may be stacked alternately, and two adjacent gate layers 411 are separated by an insulating layer 412.

A constituent material of the gate layer 411 may include a conductive material. Conductive materials include, but are not limited to, tungsten (W), cobalt (Co), copper (Cu), aluminum (Al), polysilicon, doped silicon, silicide, or any combination thereof. In some examples, each gate layer 411 includes a metal layer, e.g., a tungsten layer. In some examples, each gate layer 411 includes a doped polysilicon layer. Each gate layer 411 may include a control gate surrounding a memory cell. A gate layer 411 at the top of a stacked structure 410 may extend laterally as an upper selection gate line, a gate layer 411 at the bottom of a stacked structure 410 may extend laterally as a lower selection gate line, and a gate layer 411 extending laterally between an upper selection gate line and a lower selection gate line may serve as a word line layer.

In some examples, a stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other appropriate material.

In some examples, a memory string 308 includes a channel structure extending vertically through stacked structure 410. In some implementations, a channel structure includes a channel hole filled with semiconductor material (s) (e.g., as a semiconductor channel) and dielectric material (s) (e.g., as a memory film). In some implementations, a semiconductor channel includes silicon, e.g., polysilicon. In some implementations, a memory film is a composite dielectric layer including a tunneling layer, a storage layer (also referred to as a "charge trapping/storage layer"), and a blocking layer. A channel structure may have a cylindrical shape (e.g., a pillar shape). According to some implementations, a semiconductor channel, a tunneling layer, a storage layer and a blocking layer are radially arranged in this order from the center of the pillar toward the outer surface of the pillar. A tunneling layer may include silicon oxide, silicon oxynitride, or any combination thereof. A storage layer may include silicon nitride, silicon oxynitride, or any combination thereof. A barrier layer may include silicon oxide, silicon oxynitride, a high-k (high-k) dielectric, or any combination thereof. In an example, a memory film may include a composite layer of silicon oxide/silicon oxynitride/silicon oxide (ONO).

Figure 5:
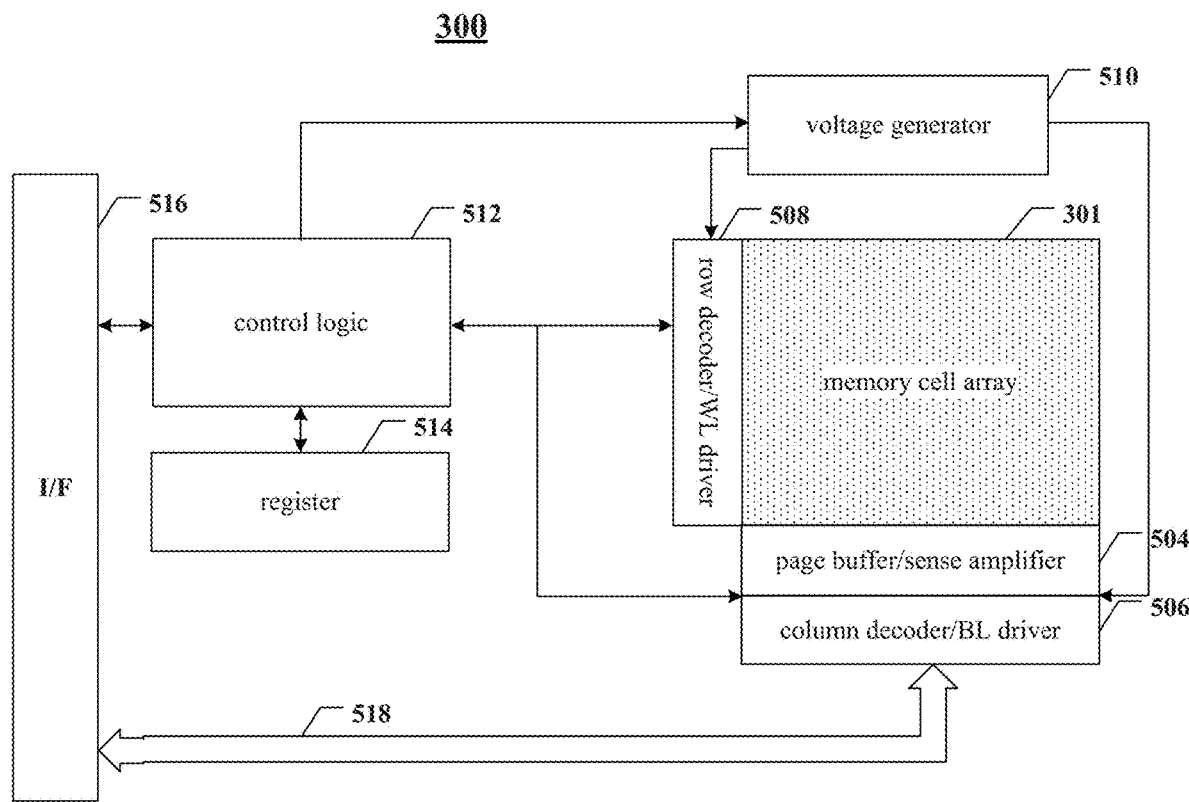
FIG. 5 is a schematic diagram of an example memory device including an array of memory cells and peripheral circuits according to an example of the present application.

Referring back to FIG. 3b, the peripheral circuit 302 may be coupled to the array of memory cells 301 through bit line 316, word line 318, source line 314, BSG line 315, and TSG line 313. The peripheral circuit 302 may include any suitable analog, digital, and mixed-signal circuitry for facilitating operation of the array of memory cells 301 through applying at least one of a voltage signal or a current signal to and sensing at least one of voltage signal or current signal from each target memory cell 306 via bit line 316, word line 318, source line 314, BSG line 315, and TSG line 313. The peripheral circuit 302 may include various types of peripheral circuits formed with metal-oxide-semiconductor (MOS) technology. For example, FIG. 5 illustrates some example peripheral circuits, the peripheral circuit includes page buffer/sense amplifier 504, column decoder/bit line driver 506, row decoder/word line driver 508, voltage generator 510, control logic 512, register 514, interface 516 and data bus 518. It should be understood that in some examples, additional peripheral circuits not shown in FIG. 5 may also be included.

The page buffer/sense amplifier 504 may be configured to read data from and program (write) data to the array of memory cells 301 according to control signals from the control logic 512. In one example, the page buffer/sense amplifier 504 may store programming data (written data) to be programmed into the array of memory cells 301. In another example, the page buffer/sense amplifier 504 may perform a programming verify operation to ensure that data has been correctly programmed into memory cell 306 coupled to selected word line 318. In yet another example, the page buffer/sense amplifier 504 may also sense a low-power signal from bit line 316 representing a data bit stored in memory cell 306 and amplify a small voltage swing to a recognizable logic level during a read operation. The column decoder/bit line driver 506 may be configured to be controlled by control logic 512 and to select one or more memory strings 308 through applying a bit line voltage generated from voltage generator 510.

The row decoder/word line driver 508 may be configured to be controlled by control logic 512 and select/deselect memory block 304 of array of memory cells 301 and select/deselect word line 318 of memory block 304. The row decoder/word line driver 508 may also be configured to drive word line 318 with a word line voltage generated from voltage generator 510. In some implementations, the row decoder/word line driver 508 may also select/deselect and drive the BSG line 315 and the TSG line 313. As described in detail below, the row decoder/word line driver 508 is configured to perform programming operations on the memory cells 306 coupled to the selected word line 318. The voltage generator 510 may be configured to be controlled by the control logic 512, and generate word line voltage (e.g., read voltage, programming voltage, pass voltage, channel boost voltage, verify voltage, etc.), bit line voltage and source line voltage to be supplied to the array of memory cells 301.

The control logic 512 may be coupled to each of other portions of the peripheral circuit described above and configured to control operations of each of the other portions of the peripheral circuit. The register 514 may be coupled to the control logic 512 and include status register, command register and address register for storing status information, command operation code (OP code) and command address for controlling operations of each of the peripheral circuits. The interface (I/F) 516 may be coupled to control logic 512 and act as a control buffer to buffer and relay control commands received from a host (not shown) to control logic 512 and to buffer and relay status information received from the control logic 512 to the host. Interface 516 may also be coupled to column decoder/bit line driver 506 via data bus 518 and act as a data I/O interface and data buffer to buffer and relay data to/from array of memory cells 301.

The basic principle of three-dimensional NAND memory is that carriers (electrons or holes) cross the charge barrier and inject a certain amount of charge into the memory cell to complete the process of data write, the storage data may then be read in accordance with the threshold voltage when the memory cell is turned on. Therefore, in order to read correct data, an ECC error correction algorithm with strong error correction capability and high efficiency is usually introduced when reading data.

However, as the use time increases, the charge stored in the memory cell will change with the increase in use time, repeated read operations, cross temperature, etc., thereby affecting the accuracy of data reading. When the threshold voltage shifts upward or downward significantly, when the original read voltage is used to read data in the memory cell, the possibility of occurring read error will be very high, and a read error exceeding the ECC error correction capability will also cause data read of the memory cell to fail.

Figure 6:
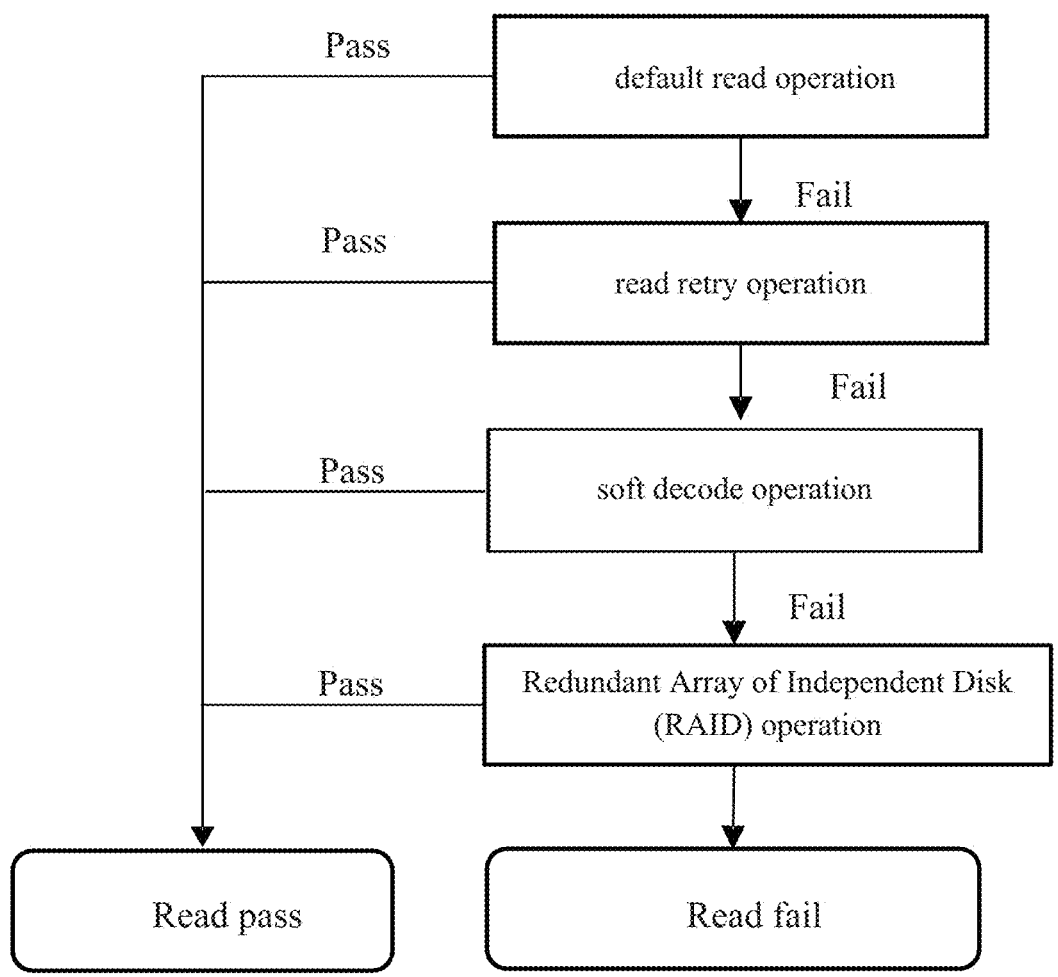
FIG. 6 is a schematic diagram of an example flow of a read operation on a memory system provided by the present application.

FIG. 6 illustrates a schematic diagram of an example read operation flow of a memory system. Combined with what is shown in FIG. 6, when the memory controller controls the memory device to perform a read operation, a default read operation (FW) is first performed on the memory cell at the corresponding physical address; if the default read operation fails, a read retry operation is performed; after the read retry operation fails, a soft decode operation is performed; after the soft decode fails, a Redundant Array of Independent Disk (RAID) operation is performed; and after the RAID operation fails, the read operation stops and the read fails because the error cannot be corrected, then the memory controller sends a read fail signal to the host 108. Read retry operation and default read operation may be applicable to hard decode.

In some implementations, the read retry operation may be performed through querying the retry table provided by the manufacturer. The essence of the read retry operation is an error correction mechanism, the retry table may provide a reference voltage for reading data, which attempts to read each memory cell again with a read voltage that deviates from the normal threshold voltage through querying the retry table, combined with ECC error correction algorithm for error correction, thereby attempting to read data correctly. If the erroneous read data is corrected, query for the retry table is stopped. If the erroneous read data cannot be corrected, the retry table will be queried until the entire retry table is traversed.

The read retry operation described above requires querying the retry table one-by-one, which will inevitably increase the number of retry and take a long time. In addition, the retry provided by the manufacturer is only a reference value in some specific environments, and the real usage scenarios are ever-changing; therefore, many scenarios cannot be covered by the retry table provided by the manufacturer, and even if the retry table is traversed, the data may not be corrected, resulting in a lot of wasted time processing the command. In summary, the method of performing read retry operation through repeatedly polling the retry table takes a long time, affects the response time of subsequent commands, and thus affects the performance of the device.

Based on one or more of the problems described above, an example of this application proposes a method for operating a memory device.

FIG. 7 is a schematic flowchart of an implementation of a method for operating a memory device provided by an example of the present application. The memory device includes an array of memory cells, the array of memory cells includes a plurality of memory cells, a preset number of the memory cells forms a code word (CW). As shown in FIG. 7, the method for operating a memory device includes the following operations.

At operation S10, the method may include obtaining a first state corresponding to the at least one of the code words at a target read voltage. The first state may include a state which is to represent a relationship of size between the number of bits in the at least one of the code words which are flipped in two results of reading at the first read voltage and the second read voltage and a first preset value. The difference between the first read voltage and the second read voltage being less than a preset voltage.

At operation S20, the method may include performing multiple adjustments to the target read voltage, and obtaining a first state corresponding to the at least one of the code words at the read voltage after each of the adjustments respectively.

At operation S30, the method may include determining a valley voltage in accordance with a variation trend of the relationship of size between the number of flipped bits and the first preset value indicated by a plurality of the obtained first states. The valley voltage is a read voltage for performing a read operation on the at least one of the code words.

Here, the structure of the memory device refers to FIG. 3b described above and will not be repeated here.

Here, a preset number of the memory cells forming a code word.

In some examples, the number of memory cells contained in the code word is the same as the number of memory cells contained in one encoding or decoding when error correction encoding or decoding is being performed. In some examples, the number of memory cells contained in a code word may be less than or equal to the number of memory cells coupled to a page, e.g., the number of memory cells contained in a code word is ¼ of the number of memory cells coupled to a page. In some examples, a code word may include a number of memory cells ranging from $2^4$ to $2^{12}$. In one example, a code word may include $2^4$, $2^8$, or $2^{12}$ memory cells.

In general, different memory systems may choose code words of different sizes to meet their requirement for performance, reliability, and storage.

Memory cells in different types of memory devices (e.g., MLC, TLC or QLC) may store different numbers of bits, thus for the code words of a same size, the numbers of memory cells included may also be different.

For example, in an implementation, the size of a code word is 4 KB, and taking the memory cell in the array of memory cells being MLC as an example, each memory cell stores 2 bits, thus the number of memory cells included in the code word is $2^{11}$.

For example, in another implementation, the size of a code word is 4 KB, and taking the memory cell in the array of memory cells being QLC as an example, each memory cell stores 4 bits, thus the number of memory cells included in the code word is $2^{10}$.

It should be noted that in practice, in a code word, there may be some additional space reserved for management and error correction; thus, the number of memory cells required in practice may slightly exceed the calculation results described above.

It may be understood that a code word may include a plurality of memory cells, and the number of memory cells included in a code word may be adjusted according to actual situations.

It should be noted that in some examples, during the process of reading the memory device, data in one page may be read by one read operation, and when the number of memory cells included in a code word may be less than the number of memory cells coupled to one page, the code word is a unit on which may be performed to obtain the first result, but the case of multiple code words is not excluded in practice. That is to say, the first result corresponding to at least one of the code words at the target read voltage may be obtained here. For example, a page may include 4 code words, a hardware operation for the page buffer may count the Fail Bit Count (FBC) of each of four code words at one time, and then the FBCs of the four code words are added to obtain the FBC of one page, and the added value is used for subsequent calculations. It may be understood that the first result here is based on data in one page, which may include multiple code words.

In some examples, the read mode of the memory device is set to a single level read (SLR) mode before obtaining the first state corresponding to the at least one of the code words at the target read voltage; the single level read mode includes reading at least one bit of the storage data stored in the memory cell with read voltages at one level.

In some examples, the memory cell includes M bits, the memory device includes M-type pages, and the memory cell with M bits reads its M bits of storage data with read voltages at N levels; the M and N are both integers greater than 1, and $N=2^M-1$.

The method may further include, for read voltages at each level of the read voltages at multiple levels corresponding to each type of page, determining the valley voltage at each level in accordance with the plurality of first states corresponding to the plurality of read voltages at each level.

Figure 8:
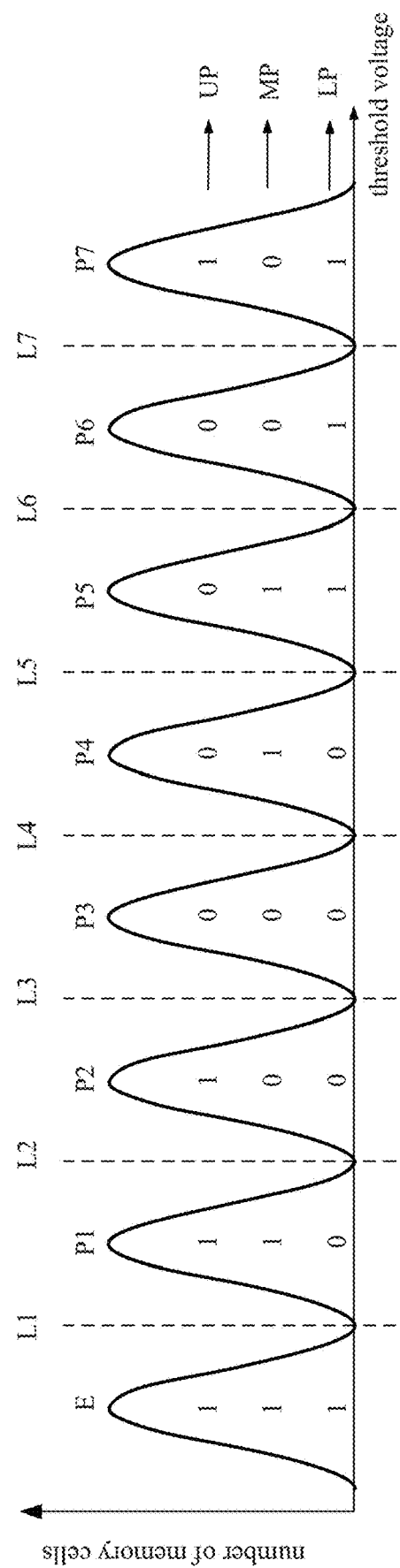
FIG. 8 is a schematic diagram of the threshold voltage distribution corresponding to a memory cell including 3 memory bits provided by an example of the present application.

In one example, when the number of bits stored in the memory cell include three bits, the corresponding storage states include the 0-th state to the 7-th state, referring to FIG. 8, the 8 states are the 0-th (also referred to as erase state) state E, the first state (also referred to as the first storage state) P1, the second state (also referred to as the second storage state) P2 . . . the 7-th state (also referred to as the 7-th storage state) P7, and the binary data corresponding to the 8 states are 111, 110, 100, 000, 010, 011, 001, 101, respectively. Accordingly, the memory device includes three types of pages, namely lower page (LP), middle page (MP), and upper page (UP).

Taking the memory cell shown in FIG. 8 as an example, the three bits and the eight states of storage data may be read by the three-bit memory cell with read voltages at 7 levels (the first-level read voltage L1, the second-level read voltage L2, and the third-level read voltage L3, the fourth-level read voltage L4, the fifth-level read voltage L5, the sixth-level read voltage L6 and the seventh-level read voltage L7 as shown in FIG. 8).

In some examples, the method for operating the memory device further includes, for read voltages at each level of the read voltages at multiple levels corresponding to each type of page, determining the valley voltage at each level in accordance with the plurality of first states corresponding to the plurality of read voltages at each level.

In one example, each type of page corresponds to read voltages at multiple levels. As shown in FIG. 8, the lower page corresponds to a first-level read voltage L1 and a fifth-level read voltage L5. The middle page corresponds to the second-level read voltage L2, the fourth-level read voltage L4, and the sixth-level read voltage L6. The upper page corresponds to the third-level read voltage L3 and the seventh-level read voltage L7. For the first-level read voltage L1 and the fifth-level read voltage L5 corresponding to the lower page, the valley voltage in the first-level read voltage L1 may be determined in accordance with a plurality of first states corresponding to the plurality of read voltages in the first-level read voltage L1. Then, the valley voltage in the fifth-level read voltage L5 may be determined in accordance with the plurality of first states corresponding to the plurality of read voltages in the fifth-level read voltage L5; thus, the valley voltage in read voltages at each level of read voltages at multiple levels corresponding to the lower page may be obtained. The process of determining the valley voltage in the read voltages at each level of the read voltages at multiple levels corresponding to the middle page and the upper page is similar to that of the lower page, and will not be repeated here.

The lower page is usually closest to the source/drain; thus, the valley voltage in read voltages at each level of read voltages at multiple levels corresponding to the lower page is determined in a higher priority, which results in the fastest access speed and the shortest response time, and ensures balanced performance and durability during data access.

It should be noted that the method for determining the valley voltage in the read voltages at each level of the read voltages at multiple levels corresponding to the lower page in a higher priority is only an example and is not used to limit the order for determining the valley voltage in the read voltages at each level of the read voltages at multiple levels corresponding to each type of page in the example of the present application.

Figure 9:
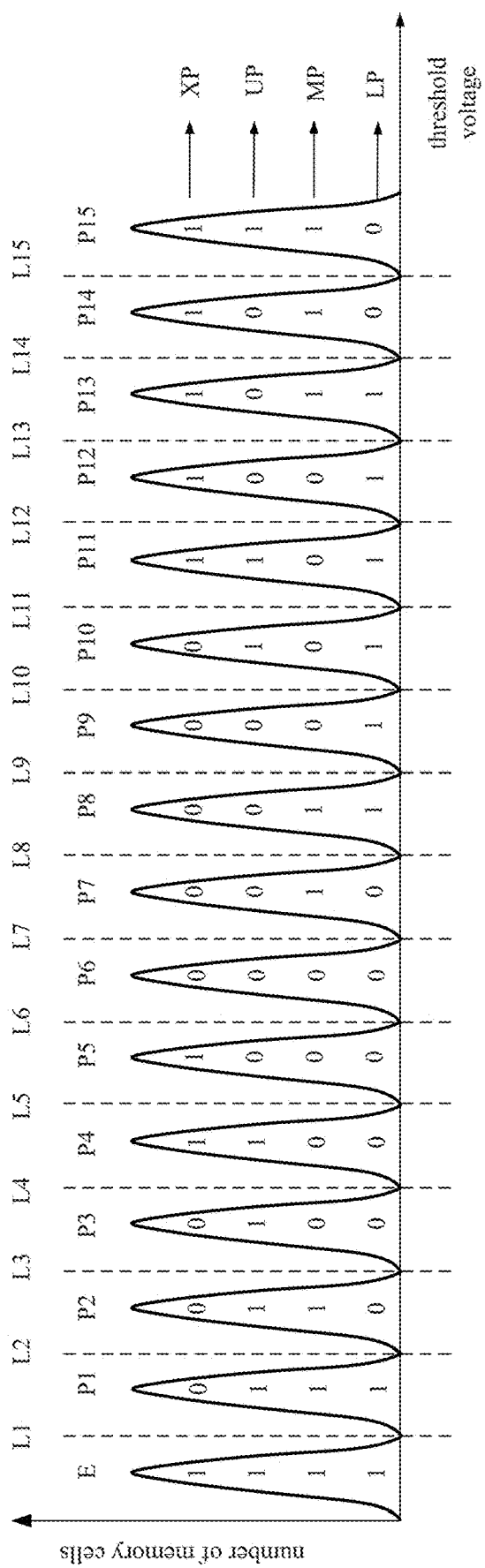
FIG. 9 is a schematic diagram of the threshold voltage distribution corresponding to a memory cell including 4 memory bits provided by an example of the present application.

In one example, when the stored bits in the memory cell include four bits, the corresponding storage states include the 0-th state to the 15-th state, referring to FIG. 9, the 16 states are the 0-th (also referred to as erase state) state E, the first state (also referred to as the first storage state) P1, the second state (also referred to as the second storage state) P2 . . . the 15-th state (also referred to as the 15-th storage state) P15, and the binary data corresponding to the 16 states are 1111, 0111, 0110 . . . 1110 respectively. Accordingly, the memory device includes four types of pages, namely lower page, middle page, upper page, and extra page (XP). Here, the four stored bits corresponding to the 16 states are stored in the lower page, middle page, upper page, and extra page respectively.

Taking the memory cell shown in FIG. 9 as an example, the four bits and the sixteen states of storage data may be read by the four-bit memory cell with read voltages at 15 levels (the first-level read voltage L1, the second-level read voltage L2, and the third-level read voltage L3, the fourth-level read voltage L4, the fifth-level read voltage L5, the sixth-level read voltage L6, the seventh-level read voltage L7, the eighth-level read voltage L8, the ninth-level read voltage L9, the tenth-level read voltage L10, the eleventh-level read voltage L11, the twelfth-level read voltage L12, the thirteenth-level read voltage L13, the fourteenth-level read voltage L14, the fifteenth-level read voltage L15 as shown in FIG. 9).

In one example, each type of page corresponds to read voltages at multiple levels. As shown in FIG. 9, the lower page corresponds to the second-level read voltage L2, the eighth-level read voltage L8, and the fourteenth-level read voltage L14. The middle page corresponds to the third-level read voltage L3, the seventh-level read voltage L7, the ninth-level read voltage L9, and the thirteenth-level read voltage L13. The upper page corresponds to the fifth-level read voltage L5, the tenth-level read voltage L10, the twelfth-level read voltage L12, and the fifteenth-level read voltage L15. The extra page corresponds to the first-level read voltage L1, the fourth-level read voltage L4, the sixth-level read voltage L6, and the eleventh-level read voltage L11.

For the second-level read voltage L2, the eighth-level read voltage L8, and the fourteenth-level read voltage L14 corresponding to the lower page, the valley voltage in the second-level read voltage L2 may be determined in accordance with a plurality of first states corresponding to the plurality of read voltages in the second-level read voltage L2. Then, the valley voltage in the eighth-level read voltage L8 may be determined in accordance with a plurality of first states corresponding to the plurality of read voltages in the eighth-level read voltage L8. Finally, the valley voltage in the fourteenth-level read voltage L14 may be determined in accordance with the plurality of first states corresponding to the plurality of read voltages in the fourteenth-level read voltage L14; thus, the valley voltage in the read voltages at each level of the read voltages at multiple levels corresponding to the lower page may be obtained. The process of determining the valley voltage in the read voltages at each level of the read voltages at multiple levels corresponding to the middle page and the upper page is similar to that of the lower page, and will not be repeated here.

Figure 10:
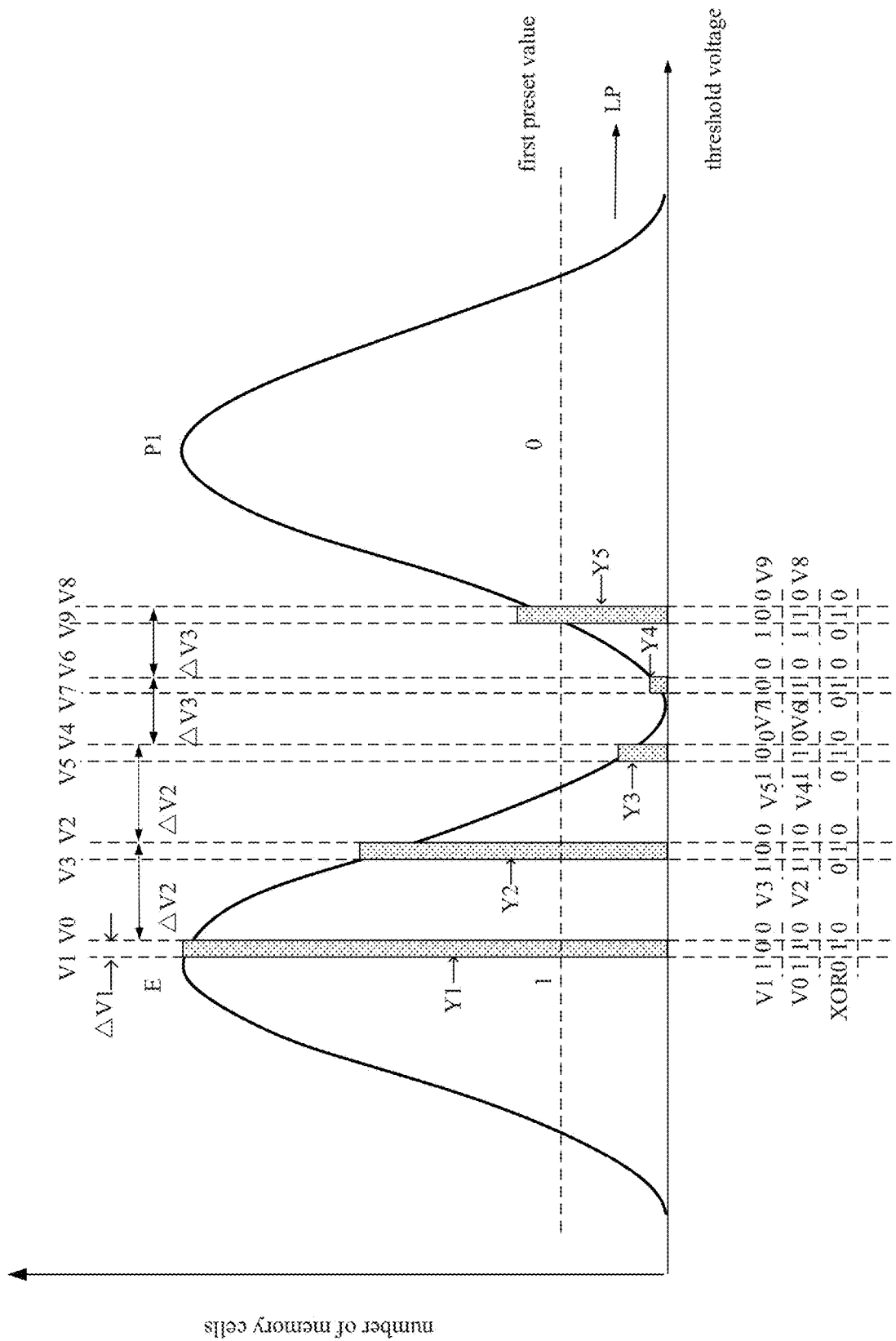
FIG. 10 is a schematic diagram of a method for confirming the valley voltage in the first-level read voltage L1 corresponding to the lower page shown in FIG. 8 provided by an example of the present application.
Figure 11:
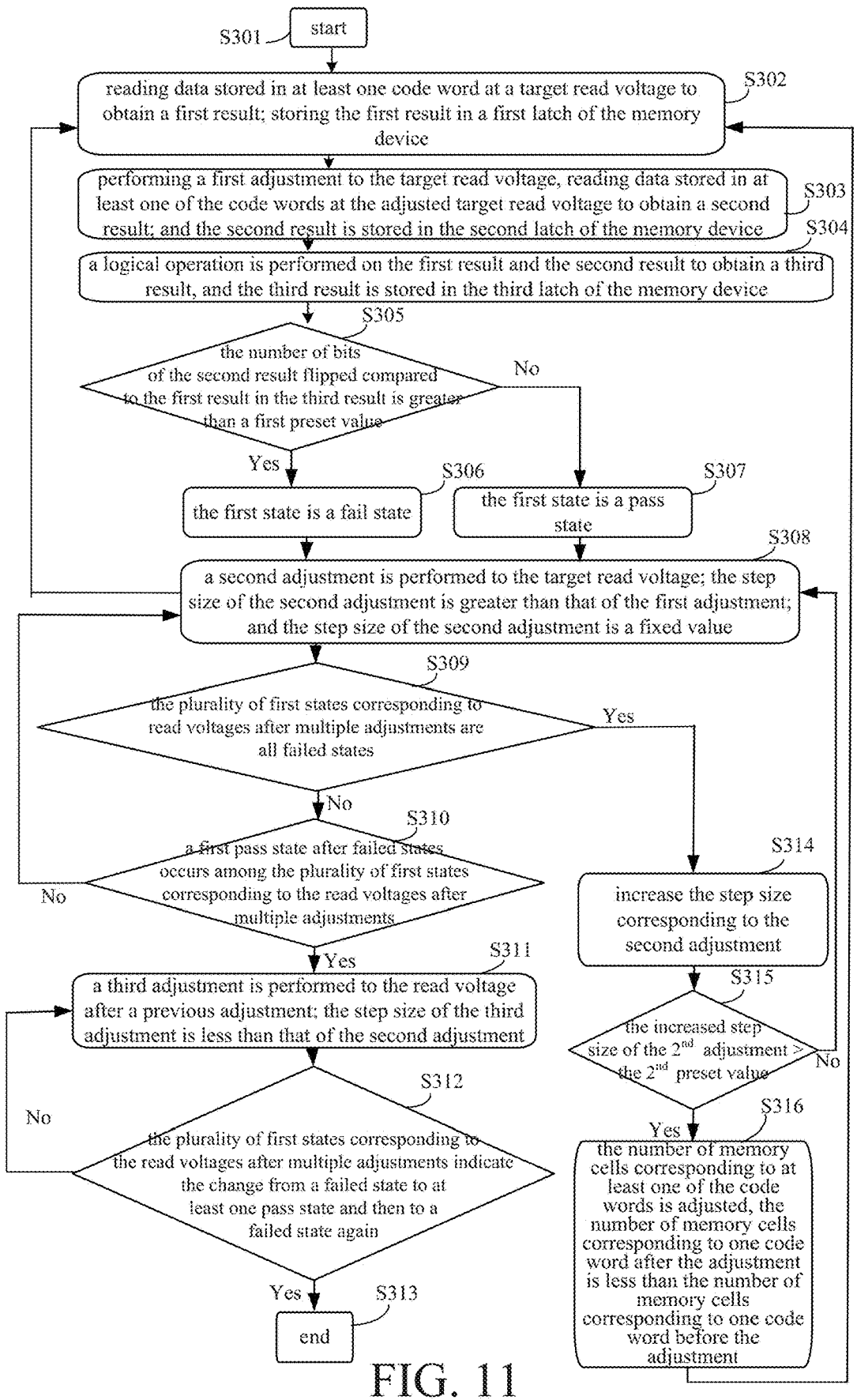
FIG. 11 is a flowchart of a method for operating a memory device provided by an example of the present application.

FIG. 10 is a schematic diagram of a method for confirming the valley voltage in the first-level read voltage L1 corresponding to the lower page shown in FIG. 8 provided by an example of the present application. FIG. 11 is a flowchart of a method for operating a memory device provided by an example of the present application. The process of determining a valley voltage may be described in detail below combined with FIGS. 8, 10, and 11.

At operation S301, the method may include obtaining the first preset value and the second preset value; the first preset value may be obtained in accordance with historical data; in some examples, the first preset value may be less than an upper limit of the fail bit count (FBC) supported by the memory device.

At operation S302, the method may include reading data stored in at least one code word at a target read voltage to obtain a first result, and storing the first result in a first latch of the memory device.

In one example, as shown in FIG. 10, reading data stored in the at least one of the code words at the target read voltage V0 to obtain a first result. In one example, the data stored in the lower pages of the memory cells in the code word is read at the target read voltage V0, the memory cell with a threshold voltage being less than the target read voltage V0 is labeled as bit 1, and the memory cell with a threshold voltage being greater than the target read voltage V0 is labeled as bit 0, thus a first result is obtained and stored in the first latch of the memory device.

It should be noted that the target read voltage V0 used for the first time here may refer to a preset read voltage that can distinguish between two adjacent storage states of the memory cell of the memory device in the previous read process. The preset read voltage may be an empirical value, or it may be default values configured when the memory device leaves the factory. The default value may be obtained through extensive simulation experiments before the memory device leaves the factory.

At operation S303, the method may include performing a first adjustment to the target read voltage, and reading data stored in at least one of the code words at the adjusted target read voltage to obtain a second result. The second result may be stored in the second latch of the memory device.

Here, the first adjustment may be understood as an adjustment with a small amplitude; and in some examples, the small amplitude refers to here, e.g., the range of the step size of the first adjustment is set to 5 mV to 20 mV, e.g., the step size of the first adjustment may be 5 mV, 10 mV, 15 mV, 20 mV.

It should be noted that the first read voltage and the second read voltage are related before and after the first adjustment; that is to say, the second read voltage is obtained after adjusting the first read voltage for the first time. Thus, the voltage difference between the first read voltage and the second read voltage is the step size of the first adjustment. The difference between the first read voltage and the second read voltage being less than the preset voltage may be understood that a smaller voltage difference may be between the first read voltage and the second read voltage. The preset voltage is related to the step size of the first adjustment, and may be a voltage slightly larger than that of the first adjustment. In some examples, the range of the preset voltage is set to 6 mV to 21 mV, e.g., the preset voltage may be 6 mV, 11 mV, 16 mV, and 21 mV.

It should be noted that the first read voltage and the second read voltage are both general concepts, and the target read voltage and all subsequent read voltages after the second adjustment may be referred to as a first read voltage, and all read voltages after the first adjustment may be referred to as a second read voltage.

In one example, as shown in FIG. 10, a first adjustment is performed on the target read voltage V0, and the data stored in the code word is read at the adjusted target read voltage (V1 shown in FIG. 10) to obtain a second result. In one example, the data stored in the lowers page of the memory cells in the code word are read at the adjusted target read voltage (V1 shown in FIG. 10), the memory cell with a threshold voltage that is less than the adjusted target read voltage (V1 shown in FIG. 10) is labeled as bit 1; the memory cell with a threshold voltage that is greater than the adjusted target read voltage (V1 shown in FIG. 10) is labeled as bit 0; thus, a second result is obtained and stored in a second latch of the memory device.

As shown in FIG. 10, there is a first voltage difference $\Delta V1$ between the target read voltage V0 and the adjusted target read voltage V1, and the size of the first voltage difference is the step size of the first adjustment. The amplitude of the step size of the first adjustment is relatively small, and the first adjustment may be understood as an adjustment with a small amplitude.

At operation S304, a logical operation is performed on the first result and the second result to obtain a third result, and the third result is stored in the third latch of the memory device.

In one example, as shown in FIG. 10, an XOR operation is performed on the first result and the second result to obtain a third result, and the third result is stored in the third latch of the memory device.

It should be noted that the XOR operation is one of the basic logical operations; in binary, if two binary numbers at the same position are the same, the result is "0"; and if two binary numbers at the same position are different, the result is "1" (e.g., same is 0, and different is 1).

As shown in FIG. 10, the part in which the bit is 1 in the third result represents the number of memory cells with threshold voltages that are different at the target read voltage V0 and the adjusted target read voltage V1; in other words, the part in which the bit is 1 in the third result represents the number of bits Y1 in the code word that are flipped in the two results of reading at the target read voltage V0 and the adjusted target read voltage V1. It should be noted that the target read voltage V0 here is the first read voltage, and the adjusted target read voltage V1 is the second read voltage.

At operation S305, the method may include comparing the number of bits in the third result that represent flip of bits in the second result relative to the first result and a first preset value, and determining whether the number of bits in the third result that represent flip of bits in the second result relative to the first result is larger than the first preset value.

When the number of bits in the third result that represent flip of bits in the second result relative to the first result is greater than the first preset value, operation S306 is performed, and the first state is obtained as a failed state.

When the number of bits in the third result that represent flip of bits in the second result relative to the first result is less than or equal to the first preset value, operation S307 is performed, and the first state is obtained as a pass state.

In some examples, the first preset value is less than the upper limit of the fail bit count supported by the memory device. The upper limit of the fail bit count supported by the memory device means that fail bits within the upper limit may be detected and corrected through the built-in error correction mechanism, while fail bits exceeding the upper limit cannot be corrected. In one example, when the number of bits in the third result that represent flip of bits in the second result relative to the first result is greater than the first preset value, it means that when the read voltage corresponding to the first state is to be the valley voltage, the read result may contain uncorrectable errors, and data integrity and reliability may be threatened. Therefore, only when the number of bits in the third result that represent flip of bits in the second result relative to the first result is less than the first preset value, the first state may be obtained as a pass state.

The size of the first preset value is related to the type of memory device, storage density, etc. The first preset value may be an empirical value, or it may be default values configured when the memory device leaves the factory, the default value is obtained through extensive simulation experiments before the memory device leaves the factory. In one example, the range of the first preset value is set to 70 to 120, and in another example, the first preset value may be 70, 80, 90, 100, 110, 120.

After operation S306 or operation S307 is performed, operation S308 is continued to be performed. At operation S308, a second adjustment is performed to the target read voltage; the step size of the second adjustment is greater than that of the first adjustment; and the step size of the second adjustment is a fixed value.

Here, the second adjustment may be understood as an adjustment with a large amplitude, and in some examples, the large amplitude here, e.g., the range of the step size of the second adjustment is set to 50 mV to 80 mV, e.g., the step size of the second adjustment may be 50 mV, 60 mV, 70 mV, 80 mV.

It should be noted that the target read voltage here and all subsequent read voltages after the second adjustment may be referred to as a first read voltage, and all the read voltages after the first adjustment may be referred to as a second read voltage.

In one example, as shown in FIG. 10, a second adjustment is performed to the target read voltage V0 to obtain the first adjusted read voltage V2, there is a second voltage difference ΔV2 between the target read voltage V0 and the first adjusted read voltage V2, and the size ΔV2 of the two voltage differences is the step size of the second adjustment. The step size of the second adjustment is greater than that of the first adjustment, e.g., the second voltage difference ΔV2 is greater than the first voltage difference ΔV1. The step size of the second adjustment is relatively large, and the second adjustment may be understood as an adjustment with a large amplitude.

It may be understood that the direction of the second adjustment to be performed to the target read voltage V0 for the first time may be random, it is just required to ensure that the absolute value of the voltage difference between the first adjusted read voltage V2 obtained after performing the second adjustment to the target read voltage V0 and the target read voltage V0 is equal to the step size of the second adjustment. The first adjusted read voltage V2 may be greater than or less than the target read voltage V0.

After operation S308 is performed, the operations return to operation S302. It should be noted that the target read voltage here is updated to the first adjusted read voltage V2.

Returning to operation S302, the data stored in the lower page of the memory cell in the code word is read at the first adjusted read voltage V2, the memory cell with a threshold voltage being less than the first adjusted read voltage V2 is labeled as bit 1, and the memory cell with a threshold voltage being greater than the first adjusted read voltage V2 is labeled as bit 0; a first result is obtained and stored in the first latch of the memory device.

When operation S303 is performed, a first adjustment is performed to the target adjusted read voltage V2, and the data stored in the code word is read at the first adjusted read voltage after adjustment (V3 shown in FIG. 10) to obtain a second result. In one example, the data stored in the lower page of the memory cell in the code word is read at the first adjusted read voltage after adjustment (V3 shown in FIG. 10), the memory cell with a threshold voltage being less than the first adjusted read voltage after adjustment (V3 shown in FIG. 10) is labeled as bit 1, the memory cell with a threshold voltage being greater than the first adjusted read voltage after adjustment (V3 shown in FIG. 10) is labeled as bit 0, a second result is obtained, and stored in a second latch of the memory device. It should be noted that the first adjusted read voltage after adjustment (V3 shown in FIG. 10) here is the second read voltage.

When operation S304 is performed, an XOR operation is performed on the first result and the second result to obtain a third result, and the third result is stored in the third latch of the memory device. In one example, as shown in FIG. 10, the part in which the bit is 1 in the third result represents the number of memory cells with threshold voltages being different at the first adjusted read voltage V2 and the first adjusted read voltage after adjustment (V3 shown in FIG. 10); in other words, the part in which the bit is 1 in the third result represents the number of bits Y2 in the code word that are flipped in the two results of reading at the first adjusted read voltage V2 and the first adjusted read voltage after adjustment (V3 shown in FIG. 10).

When operation S305 is performed, the number of bits in the third result that represent flip of bits in the second result relative to the first result is compared with a first preset value to determine whether the number of bits in the third result that represent flip of bits in the second result relative to the first result is greater than a first preset value.

When the number of bits in the third result that represent flip of bits in the second result relative to the first result is greater than the first preset value, operation S306 is performed, and the first state corresponding to the code word at the first adjusted read voltage V2 is obtained as a failed state.

When the number of bits in the third result that represent flip of bits in the second result relative to the first result is less than or equal to the first preset value, operation S307 is performed, and the first state corresponding to the code word at the first adjusted read voltage V2 is obtained as a pass state.

It may be understood that operation S302 to operation S308 are performed in a loop, so as to perform adjustments to the target read voltage, and obtain the first state corresponding to at least one of the code words at the read voltage after each of the adjustments respectively. It should be noted that in practice, the number of times for performing operation S302 to operation S308 in loop may be changed according to actual needs, and the claimed scope of the present application should not be unduly limited here.

In some examples, operation S309 is performed after operation S302 to operation S308 performed in loop for three times.

In some examples, after the first state corresponding to the code word at the first adjusted read voltage V2 is obtained, step S308 is performed again, as shown in FIG. 10, a second adjustment is performed to the first adjusted read voltage V2 to obtain a second adjusted read voltage (V4 shown in FIG. 10), and there is a second voltage difference ΔV2 between the first adjusted read voltage V2 and the second adjusted read voltage (V4 shown in FIG. 10). It should be noted that the second adjusted read voltage V4 here is the first read voltage.

After operation S308 is performed, the operations may return to operation S302. It should be noted that the target read voltage here is updated to the second adjusted read voltage V4.

When the operations return to operation S302, the data stored in the lower page of the memory cells in the code word is read at the second adjusted read voltage V4 to obtain a first result, and the first result is stored in a first latch of the memory device.

When operation S303 is performed, a first adjustment is performed to the second adjusted read voltage V4, the data stored in the code word is read at the second adjusted read voltage after adjustment (V5 shown in FIG. 10) to obtain a second result, and the second result is stored in a second latch of the memory device.

When operation S304 is performed, an XOR operation is performed on the first result and the second result to obtain a third result, and the third result is stored in the third latch of the memory device. In one example, as shown in FIG. 10, the part in which the bit is 1 in the third result represents the number of bits Y3 in the code word that are flipped in the two results of reading at the second adjusted read voltage V4 and the second adjusted read voltage after adjustment (V5 shown in FIG. 10). It should be noted that the second adjusted read voltage after adjustment (V5 shown in FIG. 10) here is the second read voltage.

When operation S305 is performed, the number of bits in the third result that represent flip of bits in the second result relative to the first result is compared with a first preset value to determine whether the number of bits in the third result that represent flip of bits in the second result relative to the first result is greater than a first preset value. When the number of bits in the third result that represent flip of bits in the second result relative to the first result is greater than the first preset value, operation S306 is performed, and the first state corresponding to the code word at the second adjusted read voltage V4 is obtained as a failed state. When the number of bits in the third result that represent flip of bits in the second result relative to the first result is less than or equal to the first preset value, operation S307 is performed, and the first state corresponding to the code word at the second adjusted read voltage V4 is obtained as a pass state.

Therefore, three corresponding first states at three different read voltages are obtained. In some implementations, as shown in FIG. 10, Y1 is greater than the first preset value, and the first state corresponding to the code word at the target read voltage V0 is a failed state. Y2 is greater than the first preset value, and the first state corresponding to the code word at the first adjusted read voltage V2 is a failed state. Y3 is less than the first preset value; thus, the first state corresponding to the code word at the second adjusted read voltage V4 is a pass state.

After the preset number of first states is obtained, operation S309 is continued to be performed. At operation S309, it is determined whether the plurality of first states corresponding to read voltages after multiple adjustments are all failed states.

If there are one or more pass states among the plurality of first states corresponding to the read voltages after multiple adjustments, operation S310 is performed. In one example, the three first states corresponding to three different read voltages shown in FIG. 10 are failed state, failed state, and pass state in sequence. Thus, there is one pass state the plurality of first states described above, then operation S310 is continued to be performed.

At operation S309, it is determined whether a first pass state after failed states occurs among the plurality of first states corresponding to the read voltage after multiple adjustments.

If a first pass state after failed states occurs among the plurality of first states corresponding to the read voltages after multiple adjustments, operation S311 is performed. In one example, the variation trend of the three first states corresponding to three different read voltages shown in FIG. 10 may be failed state, failed state, and pass state, e.g., a first pass state after failed states occurs among the plurality of first states described above.

If a first pass state after failed states does not occur among the plurality of first states corresponding to the read voltages after multiple adjustments, operation S311 is returned. In one example, the variation trend of the three first states corresponding to three different read voltages may be pass state, failed state, and failed state, operation S308 is returned. A second adjustment is performed to the adjusted read voltage after a previous adjustment and a first state at the adjusted voltage is obtained.

At operation S311, if a first pass state after failed states occurs among the plurality of first states corresponding to the read voltages after multiple adjustments, a third adjustment is performed to the read voltage after a previous adjustment; the step size of the third adjustment is less than that of the second adjustment.

After the first pass state after the failed states occurs among the plurality of first states corresponding to the read voltages after multiple adjustments, by reducing the step size which is adjusted for the read voltage after a previous adjustment, more first states may be obtained as pass states at the read voltages which are close to the read voltage at which the first pass state is obtained, thereby increasing the basis for determining the valley voltage.

In one example, as shown in FIG. 10, a third adjustment is performed to the second adjusted read voltage V4 to obtain a third adjusted read voltage V6, there is a third voltage difference ΔV3 between the second adjusted read voltage V4 and the third adjusted read voltage V6, and the size of the third voltage difference ΔV3 is the step size of the third adjustment. The step size of the third adjustment is less than that of the second adjustment, e.g., the third voltage difference ΔV3 is less than the second voltage difference ΔV2. The step size of the third adjustment is relatively small, and the third adjustment may be understood as an adjustment with a small amplitude.

In one example, the range of the step size of the third adjustment is set to 20 mV to 40 mV, and in some examples, the step size of the third adjustment may be 20 mV, 25 mV, 30 mV, 35 mV, 40 mV.

It should be noted that after operation S311 is performed, the first state corresponding to the code word at the read voltage after the third adjustment is obtained by executing the method from operations S302 to S307.

In one example, the first state corresponding to the code word at the third adjusted read voltage V6 is obtained. As shown in FIG. 10, the data stored in the lower page of the memory cells in the code word is read at the third adjusted read voltage V6 to obtain a first result, and the first result is stored in a first latch of the memory device. A first adjustment is performed to the third adjusted read voltage V6, the data stored in the code word is read at the third adjusted read voltage after adjustment (V7 shown in FIG. 10) to obtain a second result, and the second result is stored in a second latch of the memory device. An XOR operation is performed on the first result and the second result to obtain a third result, and the third result is stored in the third latch of the memory device. The part in which the bit is 1 in the third result represents the number of bits Y4 in the code word that are flipped in the two results of reading at the third adjusted read voltage V6 and the third adjusted read voltage after adjustment (V7 shown in FIG. 10). It should be noted that the third adjusted read voltage after adjustment (V7 shown in FIG. 10) here is the second read voltage.

The number of bits in the third result that represent flip of bits in the second result relative to the first result is compared with a first preset value to obtain the first state corresponding to the code word at the third adjusted read voltage V6. In an example, as shown in FIG. 10, Y4 is less than the first preset value, thus the first state corresponding to the code word at the third adjusted read voltage V6 is a pass state. In another implementation, after the first pass state after failed states occurs among the plurality of first states corresponding to the read voltage after multiple adjustments, a fourth adjustment is performed to the read voltage after a previous adjustment in accordance with the third result corresponding to the first pass state.

In some examples, the step size of the fourth adjustment changes according to the number of bits in the third result that represent flip of bits in the second result relative to the first result.

As shown in FIG. 10, the first state corresponding to the second adjusted read voltage V4 is the first pass state after failed states occurred among the plurality of first states corresponding to the read voltages after multiple adjustments, a fourth adjustment is performed to the second adjusted read voltage V4 in accordance with the counted number for the third result corresponding to the second adjusted read voltage V4. In some examples, the number of bits that represent flip of bits in the second result relative to the first result in the third result corresponding to the second adjusted read voltage V4 is to be counted, if the counted result is less than 0.5 times the first preset value, it may be considered that the number of flipped bits is small, which means that the error rate of the read result obtained by performing the read operation with the second adjusted read voltage V4 is very low. Thus, the step size of the fourth adjustment may be adjusted to be greater than that of the second adjustment, possible states may be faster explored through increased step size, thereby efficiency is improved.

If the counted result is greater than or equal to 0.5 times the first preset value, it may be considered that although the number of flipped bits is within the upper limit of the fail bit count supported by the memory device; however, the number of flipped bits is large, which means that the error rate of the read result obtained by performing the read operation with the second adjusted read voltage V4 is high. Thus, the step size of the fourth adjustment may be adjusted to be less than that of the second adjustment; by reducing the step size, more first states may be obtained as pass state at the read voltage close to the second adjusted read voltage V4 corresponding to the first pass state, thereby increasing the basis for determining the valley voltage.

The method described above flexibly and dynamically adjusts the step size of the fourth adjustment by counting the number of the bits in the third result corresponding to the first pass state, which can improve system performance and accuracy.

Operation S312 is performed after operation S311; if the plurality of first states corresponding to the read voltages after multiple adjustments indicate the change from a failed state to at least one pass state and then to a failed state again, operation S313 is performed to stop adjusting the read voltage, and the operation ends.

If the plurality of first states corresponding to the read voltages after multiple adjustments do not indicate the change from a failed state to at least one pass state and then to a failed state again, return to operation S311.

In some implementations, the third adjustment is maintained until a first failed state after pass states occurs among the plurality of first states.

In one example, the variation trend of the four first states corresponding to four different read voltages shown in FIG. 10 may be failed state, failed state, pass state, pass state; therefore, it is required to return to operation S311 to perform a third adjustment to the third adjusted read voltage V6 to obtain a fourth adjusted read voltage V8, and the first state corresponding to the code word at the fourth adjusted read voltage V8 is obtained.

As shown in FIG. 10, the data stored in the lower page of the memory cells in the code word is read at the fourth adjusted read voltage V8 to obtain a first result, and the first result is stored in a first latch of the memory device. A first adjustment is performed to the fourth adjusted read voltage V8, the data stored in the code word is read at the fourth adjusted read voltage after adjustment (V9 shown in FIG. 10) to obtain a second result, and the second result is stored in a second latch of the memory device. An XOR operation is performed on the first result and the second result to obtain a third result. The part in which the bit is 1 in the third result represents the number of bits Y5 in the code word that are flipped in the two results of reading at the fourth adjusted read voltage V2 and the fourth adjusted read voltage after adjustment (V9 shown in FIG. 10). Y5 is greater than the first preset value; thus, the first state corresponding to the code word at the fourth adjusted read voltage V8 is a failed state. It should be noted that the fourth adjusted read voltage after adjustment (V9 shown in FIG. 10) here is the second read voltage.

Table 1 is an example of a plurality of first results obtained with multiple iterations shown in FIG. 10.

TABLE 1

| Iteration order | First state |
| --- | --- |
| 1 | fail |
| 2 | fail |
| 3 | pass |
| 4 | pass |
| 5 | fail |

When the operations continue to perform operation S312, it may be seen from Table 1 that the plurality of first states corresponding to the read voltages after multiple adjustments indicate the change from a failed state to at least one pass state and then to a failed state again; at this time, the read voltage is stopped to be adjusted, and the operation ends.

In other examples, after the first failed state after pass states occurs among the plurality of first states, the second adjustment is performed to the read voltage after a previous adjustment. As shown in Table 1 and FIG. 10, five first states are obtained after 5 iterations, and in the fifth iteration, at the fourth adjusted read voltage V8, a change from a failed state to at least one pass state and then to a failed state is obtained. Here, an additional second adjustment may be performed to the fourth adjusted read voltage V8, and the first state corresponding to the fourth adjusted read voltage after adjustment may be obtained, Therefore, the accuracy of determining the valley voltage based on the variation trend of the plurality of first states may be further enhanced.

In some implementations, when the number of the pass states between the failed states at two ends indicated by the plurality of first states corresponding to the adjusted read voltages includes an even number, the average of the adjusted read voltages corresponding to two pass states at a middle position among a plurality of pass states is to be the valley voltage.

In one example, among the plurality of first states shown in Table 1, the average of the read voltages corresponding to the first states obtained in the third and fourth iterations is to be the valley voltage.

It may be understood that the average of the read voltages corresponding to the first states obtained in the third and fourth iterations is to be the valley voltage in the first-level read voltage L1 corresponding to the lower page shown in FIG. 8.

It should be noted that in practice, the number of iterations may be changed according to actual needs, the implementation of determining the valley voltage by obtaining 5 first states with 5 iterations here is only an example, and the present scope of the present application should not be unduly limited.

In some examples, when the number of the pass states between the failed states at two ends indicated by the plurality of first states corresponding to the adjusted read voltages includes one, the adjusted read voltage corresponding to the one pass state is to be the valley voltage. In one example, Table 2 is an example of the plurality of first states obtained with multiple iterations. Among the plurality of first states shown in Table 3, the read voltage corresponding to the first state obtained at the third iteration is to be the valley voltage.

TABLE 2

| Iteration order | a first result |
| --- | --- |
| 1 | fail |
| 2 | fail |
| 3 | pass |
| 4 | fail |

In some implementations, when the number of the pass states between the failed states at two ends indicated by the plurality of first states corresponding to the adjusted read voltages include more than one, the adjusted read voltage corresponding to the one pass state at a middle position among the more than one pass states is to be the valley voltage.

In one example, the Table 3 shows that the number of the pass states between the failed states at two ends indicated by the plurality of first states corresponding to the adjusted read voltages includes 3, the adjusted read voltage corresponding to the one pass state at a middle position among the 3 pass states is to be the valley voltage, e.g., the read voltage corresponding to the first state obtained at the fourth iteration is to be the valley voltage.

If the determination result of operation S309 in FIG. 11 is Yes, e.g., the plurality of first states corresponding to the read voltages after multiple adjustments are all failed states, indicating that no pass state occurs among the plurality of first states; then operation S314 is performed, where the step size corresponding to the second adjustment is increased.

TABLE 3

| Iteration order | First state |
| --- | --- |
| 1 | fail |
| 2 | fail |
| 3 | pass |
| 4 | pass |
| 5 | pass |
| 6 | fail |

The fact that no pass state occurs among the plurality of first states corresponding to the read voltages after multiple adjustments indicates that the current step size corresponding to the second adjustment is too small, which results in a small adjustment amplitude for the voltage. Therefore, through increasing the step size corresponding to the second adjustment to increase the adjustment amplitude for the voltage, the speed of finding the first pass state is increased.

Operation S315 is performed after operation S314; herein, the increased step size of the second adjustment is compared with the second preset value to determine whether the increased step size of the second adjustment is greater than the second preset value.

In some examples, the second preset value is used as a limit value or restriction condition for controlling the step size of the second adjustment to balance the speed and accuracy. The magnitude of the second preset value is related to the type of memory device, storage density, etc. The second preset value may be an empirical value, or it may be default values configured when the memory device leaves the factory, the default value is obtained through extensive simulation experiments before the memory device leaves the factory. In one example, the range of the second preset value is set to 80 mV to 100 mV.

When the increased step size of the second adjustment is less than or equal to the second preset value, it means that when the voltage is adjusted with the step size, the first pass state is found more quickly while the accuracy is not reduced. At this time, operation S308 is re-performed with the increased step size of the second adjustment.

When the increased step size of the second adjustment is greater than the second preset value, it means that when the voltage is adjusted with this step size; although the first pass state is found more quickly, some states may be missed due to the large adjustment amplitude; therefore, the accuracy of using the plurality of first states as a basis for determining the valley voltage is reduced. Here, operation S316 is performed, where the number of memory cells corresponding to at least one of the code words is adjusted, the number of memory cells corresponding to the code word after the adjustment is less than the number of memory cells corresponding to the code word before the adjustment, then operation S302 is re-performed.

It may be understood that when the increased step size of the second adjustment is greater than the second preset value, a balance between the speed and accuracy may be achieved by reducing the number of memory cells corresponding to the code word. In some examples, by reducing the number of memory cells corresponding to the code words, the total amount of data contained in the third result may be reduced, and the reduction of the total amount may reduce the number counted from the total amount to a certain extent. For example, the number of bits in the third result that represent flip of bits in the second result relative to the first result may also be reduced, and it is easier for the number of bits in the third result that represent flip of bits in the second result relative to the first result to be within the range of the first preset value. Therefore, it is easier to find a first pass state among the plurality of first states corresponding to the read voltages after multiple adjustments.

It should be noted that the process of determining the valley voltages in read voltages at other levels corresponding to the lower page and the process of determining the valley voltages in the multi-level read voltages corresponding to the middle page and upper page are similar to the method disclosed in the example described above, and will not be repeated here.

For example, taking the memory cell contained in the code word as a TLC memory cell, read voltages at 7 levels are required to read its stored data which includes three bits and eight states; therefore, the method for determining the valley voltage disclosed in the above example may be performed for seven times to obtain seven valley voltages corresponding to the read voltages at 7-levels, respectively.

The method for operating the memory device provided by the example of the present application, takes the relationship of size between the number of bits in the code words which are flipped in two results of reading at the first read voltage and the second read voltage and a first preset value as the first state, the code word contains a preset number of the memory cells; performs multiple adjustments to the target read voltage, and obtains the first state corresponding to the code word at read voltage after each of the adjustments respectively; determines a valley voltage in accordance with a variation trend of the relationship of size between the number of flipped bits and the first preset value indicated by a plurality of the obtained first states, the valley voltage is to be a read voltage for performing a read operation on the code words, such that this method is able to effectively avoid the problems of long time consumption and incomplete scene coverage caused by using the retry table, and to save the space occupied by the retry table, find the valley voltage more quickly and accurately, thereby effectively reducing the time delay in determining the valley voltage and improving product reliability and user experience.

It should be noted that the methods disclosed in the examples of the present application are able to solve many problems existing in the read retry operation, but are not used to limit the application scenarios in the examples of the present application, and the methods disclosed in the examples of the present application are also applicable to conventional read operations.

An example of the present application provides a memory device, as shown in FIG. 3b, the memory device 300 includes: an array of memory cells 301, including a plurality of memory cells 306, a preset number of memory cells 306 forming a code word; peripheral circuit 302, coupled to the array of memory cells 301 and configured to perform the following operations shown in FIG. 7.

At operation S10, the method may include obtaining a first state corresponding to at least one of the code words at a target read voltage; the first state is to represent a relationship of size between the number of bits in the at least one of the code words which are flipped in two results of reading at the first read voltage and the second read voltage and a first preset value; the difference between the first read voltage and the second read voltage is less than a preset voltage.

At operation S20, the method may include performing multiple adjustments to the target read voltage, and obtaining the first state corresponding to the at least one of the code words at the read voltage after each of the adjustments respectively.

At operation S30, the method may include determining a valley voltage in accordance with a variation trend of the relationship of size between the number of flipped bits and the first preset value indicated by a plurality of the obtained first states; the valley voltage is to be a read voltage for performing a read operation on the at least one of the code words.

Here, the structure of the memory device refers to FIG. 3b described above, and the structure of the peripheral circuit refers to FIG. 5 described above, which will not be repeated here.

In some examples, the peripheral circuit is configured to: set the read mode of the memory device to a single level read mode before obtaining the first state corresponding to at least the code word at the target read voltage; the single level read mode includes reading at least one bit of the storage data stored in the memory cell with read voltages at one level.

In some examples, the memory cell includes M bits, the memory device includes M-type pages, and the memory cell with M bits reads its M bits of storage data with read voltages at N levels; the M and N are both integers greater than 1, and $N=2^M-1$; the peripheral circuit is configured to: for read voltages at each level of the read voltages at multiple levels corresponding to each type of page, determine the valley voltage at each level in accordance with the plurality of first states corresponding to the multiple read voltages at each level.

In one example, when the stored bits in the memory cell include three bits, the corresponding storage states include the 0-th state to the 7-th state, referring to FIG. 8, the 8 states are the 0-th state E, the first state P1, the second state P2 . . . the 7-th state P7, and the binary data corresponding to the 8 states are 111, 110, 100, 000, 010, 011, 001, 101, respectively. Accordingly, the memory device includes three types of pages, namely lower page, middle page, and upper page. Here, the three stored bits corresponding to the 8 states are stored in the lower page, middle page, and upper page respectively. Taking the memory cell shown in FIG. 8 as an example, the three-bit memory cell reads its storage data including three bits and eight states with read voltages at 7 levels.

In one example, each type of page corresponds to read voltages at multiple levels, as shown in FIG. 8, and the lower page corresponds to a first-level read voltage L1 and a fifth-level read voltage L5. For the first-level read voltage L1 and the fifth-level read voltage L5 corresponding to the lower page, the valley voltage in the first-level read voltage L1 may be determined in accordance with a plurality of first states corresponding to the multiple read voltages in the first-level read voltage L1. Then, the valley voltage in the fifth-level read voltage L5 may be determined in accordance with the plurality of first states corresponding to the multiple read voltages in the fifth-level read voltage L5, thus, the valley voltage in the read voltages at each level of read voltages at multiple levels corresponding to the lower page may be obtained.

The process of determining the valley voltage in the read voltages at each level of the read voltages at multiple levels corresponding to the middle page and the upper page is similar to that of the lower page, and will not be repeated here.

In some examples, the peripheral circuit is configured to: obtain a first preset value and a second preset value; the first preset value may be obtained in accordance with historical data; the first preset value is less than a fail bit count supported by the memory device upper limit.

In some examples, the peripheral circuit is configured to: read the data stored in at least one code word at the target read voltage to obtain a first result; perform a first adjustment to the target read voltage and read the data stored in at least one of the code words at the adjusted target read voltage to obtain a second result; perform a logical operation on the first result and the second result to obtain a third result; compare the number of bits in the third result that represent flip of bits in the second result relative to the first result and a first preset value to obtain a first state.

In some examples, the peripheral circuit includes: a first latch D1, a second latch D2, and a third latch D3; the first latch D1 is configured to store the first result; the latch D2 is configured to store the second result; and the third latch D3 is configured to store the third result.

For example, the first latch D1, the second latch D2, and the third latch D3 are located in the page buffer of the peripheral circuit.

In some examples, an XOR operation is performed on the first result and the second result to obtain a third result. As shown in FIG. 10, the part in which the bit is 1 in the third result represents the number of memory cells with threshold voltages being different at the target read voltage V0 and the adjusted target read voltage (V1 shown in FIG. 10); in other words, the part in which the bit is 1 in the third result represents the number of bits Y1 in the code word that are flipped in the two results of reading at the target read voltage V0 and the adjusted target read voltage (V1 shown in FIG. 10).

In some examples, when the number of bits in the third result that represent flip of bits in the second result relative to the first result is greater than the first preset value, the first state is to be a failed state; when the number of bits in the third result that represent flip of bits in the second result relative to the first result is less than or equal to the first preset value, the first state is to be a pass state.

In some examples, the peripheral circuit is configured to: when multiple adjustments are performed to the target read voltage, perform a second adjustment to the read voltage after a previous adjustment for each of the multiple adjustments; the step size of the second adjustment is greater than that of the first adjustment; and the step size of the second adjustment is a fixed value.

In one example, referring to Table 1 and FIG. 10, a second adjustment is performed to the target read voltage V0 to obtain a first adjusted read voltage V2, there is a second voltage difference ΔV2 between the target read voltage V0 and the first adjusted read voltage V2, and the magnitude of the second voltage difference ΔV2 is the step size of the second adjustment. The step size of the second adjustment is greater than that of the first adjustment, e.g., the second voltage difference ΔV2 is greater than the first voltage difference ΔV1. The amplitude of the step size of the second adjustment is relatively large, and the second adjustment may be understood as an adjustment with a large amplitude.

In some examples, the peripheral circuit is configured to: after a first pass state after failed states occurs among the plurality of first states corresponding to the read voltages after multiple adjustments, a third adjustment is performed to the read voltage after a previous adjustment; the step size of the third adjustment is less than that of the second adjustment.

In some implementations, as shown in FIG. 10, the first state corresponding to the first adjusted read voltage V2 is a failed state. A second adjustment is performed to the first adjusted read voltage V2 to obtain a second adjusted read voltage V4, and there is a second voltage difference ΔV2 between the first adjusted read voltage V2 and the second adjusted read voltage V4.

Therefore, three corresponding first states at three different read voltages are obtained. In some implementations, as shown in FIG. 10, Y1 is greater than the first preset value, and the first state corresponding to the code word at the target read voltage V0 is a failed state. Y2 is greater than the first preset value, and the first state corresponding to the code word at the first adjusted read voltage V2 is a failed state. Y3 is less than the first preset value, thus the first state corresponding to the code word at the second adjusted read voltage V4 is a pass state.

The variation trend of the three first states corresponding to three different read voltages shown in FIG. 10 may be failed state, failed state, and pass state, e.g., a pass state first after failed states occurs among the plurality of first states described above. Therefore, a third adjustment is performed to the second adjusted read voltage V4 to obtain a third adjusted read voltage V6, there is a third voltage difference ΔV3 between the second adjusted read voltage V4 and the third adjusted read voltage V6, and the magnitude of the third voltage difference ΔV3 is the step size of the third adjustment. The step size of the third adjustment is less than that of the second adjustment, e.g., the third voltage difference ΔV3 is less than the second voltage difference ΔV2. The amplitude of the step size of the third adjustment is relatively small, and the third adjustment may be understood as an adjustment with a small amplitude.

As shown in FIG. 10, the part in which the bit is 1 in the third result represents the number of bits Y4 in the code word that are flipped in the two results of reading at the third adjusted read voltage V6 and the third adjusted read voltage after adjustment (V7 shown in FIG. 10). Y4 is less than the first preset value, thus the first state corresponding to the code word at the third adjusted read voltage V6 is a pass state.

In another implementation, the peripheral circuit is configured to: after the first pass state after failed states occurs among the plurality of first states corresponding to the read voltages after multiple adjustments, perform a fourth adjustment to the read voltage after a previous adjustment in accordance with the third result corresponding to the first pass state.

In some examples, the step size of the fourth adjustment changes according to the number of bits in the third result that represent flip of bits in the second result relative to the first result.

As shown in FIG. 10, the first state corresponding to the third adjustment to the second adjusted read voltage V4 is the first pass state after failed states occurs among the plurality of first states corresponding to the read voltages after multiple adjustments, a fourth adjustment is performed to the second adjusted read voltage V4 in accordance with the counted number for the third result corresponding to the second adjusted read voltage V4. In some examples, the number of bits in the third result corresponding to the second adjusted read voltage V4 which represents flip of bits in the second result relative to the first result may be counted, if the counted result is less than 0.5 times the first preset value, it may be considered that the number of flipped bits is small, which means that the error rate of the read result obtained by performing the read operation with the second adjusted read voltage V4 is very low. In this instance, the step size of the fourth adjustment may be adjusted to be greater than that of the second adjustment, possible states may be faster explored by an increased step size, thereby efficiency is improved.

If the counted result is greater than or equal to 0.5 times the first preset value, it may be considered that although the number of flipped bits is within the upper limit of the fail bit count supported by the memory device; however, the number of flipped bits is large, which means that the error rate of the read result obtained by performing the read operation with the second adjusted read voltage V4 is high. In this instance, the step size of the fourth adjustment may be adjusted to be less than that of the second adjustment, by reducing the step size, more first states may be obtained as pass state at the read voltages close to the second adjusted read voltage V4 corresponding to the first pass state, thereby increasing the basis for determining the valley voltage.

In some examples, the peripheral circuit is configured to: maintain the third adjustment until a first failed state after pass states occurs among the plurality of first states.

In one example, the variation trend of the four first states corresponding to four different read voltages shown in FIG. 10 may be failed state, failed state, pass state, pass state; therefore, a third adjustment may be performed for the third adjusted read voltage V6 to obtain a fourth adjusted read voltage V8, and the first state corresponding to the code word at the fourth adjusted read voltage V8 is obtained. The part in which the bit is 1 in the third result represents the number of bits Y5 in the code word that are flipped in the two results of reading at the fourth adjusted read voltage V8 and the fourth adjusted read voltage after adjustment (V9 shown in FIG. 10).

In some implementations, the peripheral circuit is configured to: when multiple adjustments are performed to the target read voltage, when the change from a failed state to at least one pass state and then to a failed state again is indicated by the plurality of first states corresponding to the read voltages after multiple adjustments, stop adjusting the read voltage.

Since the number of bits Y5 in the code word that are flipped in the two results of reading at the fourth adjusted read voltage V8 and the fourth adjusted read voltage after adjustment (V9 shown in FIG. 10) is greater than the first preset value, the first state corresponding to the code word at the fourth adjusted read voltage V8 is a failed state; that is, as shown in Table 1, the plurality of first states indicate the change from a failed state to at least one pass state and then to a failed state again here, then the read voltage is stopped to be adjusted.

In other examples, after a first failed state after pass states occurs among the plurality of first states, the second adjustment is performed to the read voltage after a previous adjustment. As shown in Table 1 and FIG. 10, five first states are obtained after 5 iterations, and in the fifth iteration, at the fourth adjusted read voltage V8, the change from a failed state to at least one pass state and then to a failed state is obtained. Here, an additional second adjustment may be performed to the fourth adjusted read voltage V8, and the first state corresponding to the fourth adjusted read voltage after adjustment may be obtained. Therefore, the accuracy of determining the valley voltage based on the variation trend of the plurality of first states may be further enhanced.

In some implementations, the peripheral circuit is configured to: when the number of the pass states between the failed states at two ends indicated by the plurality of first states corresponding to the adjusted read voltages include an even number, the average of the adjusted read voltages corresponding to the two pass states at a middle position in a plurality of pass states is to be the valley voltage.

In one example, among the plurality of first states shown in Table 1, the average of the read voltages corresponding to the first states obtained in the third and fourth iterations is to be the valley voltage.

It may be understood that the average of the read voltages corresponding to the first states obtained in the third and fourth iterations is the valley voltage in the first-level read voltage L1 corresponding to the lower page shown in FIG. 8.

In some examples, the peripheral circuit is configured to: when the number of the pass states between the failed states at two ends indicated by the plurality of first states corresponding to the adjusted read voltages include one, the adjusted read voltage corresponding to the one pass state is to be the valley voltage.

In one example, among the plurality of first states shown in Table 2, the read voltage corresponding to the first state obtained in the third iteration is to be the valley voltage.

In some implementations, the peripheral circuit is configured to: when the number of the pass states between the failed states at two ends indicated by the plurality of first states corresponding to the adjusted read voltages include more than one, the adjusted read voltage corresponding to one pass state at a middle position among the more than one pass states is to be the valley voltage.

In one example, the number of the pass states between the failed states at two ends indicated by the plurality of first states corresponding to the adjusted read voltages shown in the Table 3 include 3; the adjusted read voltage corresponding to one pass state at a middle position among the 3 pass states is the valley voltage, e.g., the read voltage corresponding to the first state obtained in the fourth iteration is to be the valley voltage.

In some examples, the peripheral circuit is configured to: when the plurality of first states corresponding to the read voltages after multiple adjustments are all failed states, increase the step size corresponding to the second adjustment; when an increased step size of the second adjustment exceeds the second preset value, adjust the number of memory cells corresponding to at least one of the code words, the number of memory cells corresponding to the code word after adjustment is less than the number of memory cells corresponding to the code word before adjustment.

In some examples, the second preset value is used as a limit value or restriction condition for controlling the step size of the second adjustment, so as to balance the speed and accuracy. The magnitude of the second preset value is related to the type of memory device, storage density, etc. The second preset value may be an empirical value, or it may be default values configured when the memory device leaves the factory, the default value is obtained through extensive simulation experiments before the memory device leaves the factory. In one example, the range of the second preset value is set to 80 mV to 100 mV.

It may be understood that when the increased step size of the second adjustment is greater than the second preset value, a balance between the speed and accuracy may be achieved by reducing the number of memory cells corresponding to the code word. In one example, by reducing the number of memory cells corresponding to the code word, the total amount of data contained in the third result may be reduced, and the reduction of the total amount may reduce the number counted from the total amount to a certain extent. For example, the number of bits in the third result that represent flip of bits in the second result relative to the first result may also be reduced, and it is easier for the number of bits in the third result that represent flip of bits in the second result relative to the first result to be within the range of the first preset value. Therefore, it is easier to find a first pass state among the plurality of first states corresponding to the read voltages after multiple adjustments.

Figure 12:
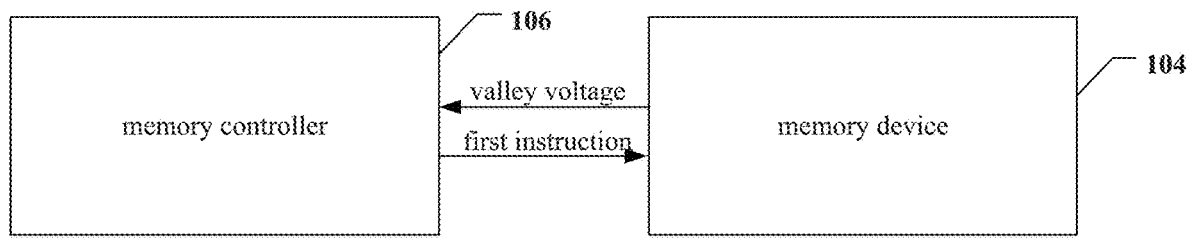
FIG. 12 is a block diagram of a memory system provided by an example of the present application.

An example of the present application provides a memory system, as shown in FIG. 12, the memory system 102 includes: one or more memory devices 104 as described in the above examples; and a memory controller 106 coupled to the memory device 104 and controlling the memory device 104.

In some examples, the memory controller 106 is configured to: send a first instruction before performing a read operation on data stored in the memory device 104, the first instruction indicating obtaining the valley voltage; the memory device 104 is configured to: receive the first instruction, obtain a valley voltage, and send the obtained valley voltage to the memory controller 106; the memory controller 106 is further configured to: perform a read operation on data stored in the memory device 104 with the valley voltage; perform an error correction code decoding operation on the read result of the read operation.

In some examples, the error correction code decoding operation includes a hard-decoding operation employing a Low Density Parity Check Code (LDPC).

Thus, the memory controller directly receives the valley voltage obtained from the memory device side, which reduces the time for data transmission between the memory controller and the memory device, and reserves sufficient time for subsequent error correction code decoding operations on the read results of the read operation. Furthermore, the memory controller directly performs a read operation and an error correction code decoding operation in accordance with the valley voltage, which shortens the overall operation time.

An example of the present application provides a method for operating a memory system, the method includes: sending a first instruction before performing a read operation on data stored in the memory device of the memory system, wherein the first instruction indicates to obtain a valley voltage; the valley voltage is obtained according to the method of any one of the examples described above; performing a read operation on data stored in the memory device with the valley voltage; performing an error correction code decoding operation on the read result of the read operation.

Figure 13:
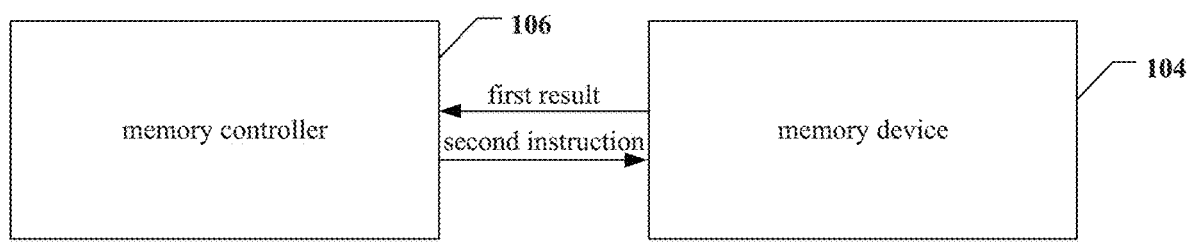
FIG. 13 is a block diagram of a memory system provided by another example of the present application.

Another example of the present application provides a memory system, as shown in FIG. 13, the memory system 102 including at least one memory device 104, the memory device 104 including a plurality of memory cells, a preset number of the memory cells forming a code word; a memory controller 106 coupled to the at least one memory device 104 and configured to: obtain a first state corresponding to the at least one of the code words at a target read voltage; the first state includes a state which is to represent a relationship of size between the number of bits in the at least one of the code words which are flipped in two results of reading at the first read voltage and the second read voltage and a first preset value; the difference between the first read voltage and the second read voltage is less than a preset voltage; perform multiple adjustments to the target read voltage, and obtain a first state corresponding to the at least one of the code words at the read voltage after each of the adjustments respectively; determine a valley voltage in accordance with a variation trend of the relationship of size between the number of flipped bits and the first preset value indicated by a plurality of the obtained first states; the valley voltage is to be a read voltage for performing a read operation on the at least one of the code words.

In some examples, the memory controller 106 is configured to: send a second instruction before performing a read operation on data stored in the memory device 104, the second instruction indicates to obtain the first states corresponding to the code word at multiple different read voltages; the memory device 104 is configured to: receive the second instruction, obtain a plurality of first states corresponding to the at least one of the code words at multiple different read voltages, and send the obtained first states to the memory controller 106; the memory controller 106 is further configured to: determine a valley voltage with the plurality of first states respectively corresponding to multiple different read voltages; and perform a read operation on data stored in the memory device with the valley voltage.

In some examples, the memory device 104 is configured to: read data stored in the at least one of the code words at the target read voltage to obtain a first result; perform a first adjustment to the target read voltage and read data stored in the at least one of the code words at the target read voltage to obtain a second result; perform a logical operation on the first result and the second result to obtain a third result; compare the number of bits in the third result that represent flip of bits in the second result relative to the first result and a first preset value to obtain a first state.

In some examples, the data amount of the first result is less than a preset threshold of data amount.

Figure 14:
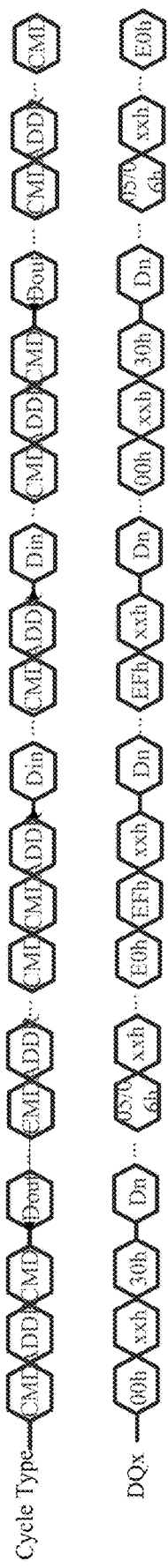
FIG. 14 is a timing diagram for performing an read retry operation provided by the present application.

FIG. 14 is a timing diagram for performing a read retry operation provided by an example of the present application. DQx may be represented as a data bus signal, and Cycle Type may further represent the type of data bus signal.

As shown in FIG. 14, the read command may include, e.g., two subcommands (e.g., 00h and 30h); and in one example, the memory device transmits the address ADDR of the data to be read (e.g., two column addresses C1 to C2 and three row addresses R1 to R3) between received subcommands 00h and 30h. After the memory device receives the subcommand 30h, during the reading time, the corresponding data DATA (e.g., Dn) in the page of the receiving address may be buffered in the page buffer, and then the data DATA will be read on demand. It should be noted that in the example described above, data corresponding to a page needs to be frequently transmitted between the memory device and the memory controller when performing a read retry operation, and it takes a long time to transmit the data.

Figure 15:
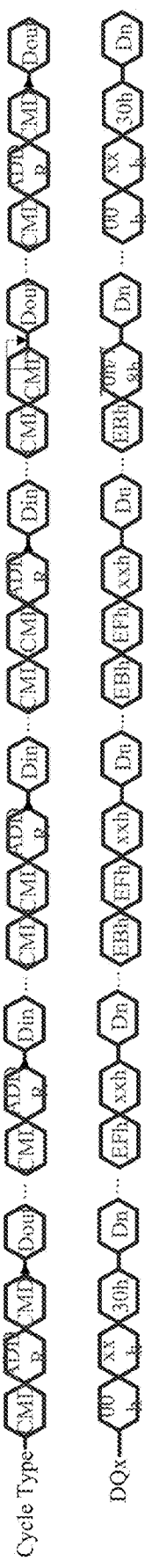
FIG. 15 is a timing diagram for determining the valley voltage and performing a read operation provided by an example of the present application.

FIG. 15 is a timing diagram for determining the valley voltage and performing a read operation provided by an example of the present application. As shown in FIG. 15, in addition to the conventional read command (e.g., the read command includes two subcommands (e.g., 00h and 30h)), the example of the present application also includes a second instruction, e.g., the second instruction includes the subcommands EBh and 70h/78h. In an illustrated example, the memory device 104 transmits the address ADDR of the data to be read (e.g., two column addresses C1 to C2 and three row addresses R1 to R3) between received subcommands 00h and 30h. The memory device 104 receives subcommands EBh and 70h/78h of the second instruction after receiving the subcommand 30h. As indicated by the second instruction, the memory device 104 obtains a plurality of first states corresponding to the code word at multiple different read voltages, and sends the obtained first states to the memory controller. The memory controller determines a valley voltage with the plurality of first states respectively corresponding to multiple different read voltages received from the memory device; and perform a read operation on data stored in the memory device with the valley voltage.

It should be noted that the second instruction provided in the example of the present application is only an example and should not unduly limit the claimed scope of the present application.

In some examples, the data amount of the first state is less than the preset threshold of data amount. For example, the data amount of the first state ranges from 1 byte to 4 byte; therefore, in the process of determining the valley voltage, the amount of data transferred between the memory device and the memory controller is small and the data is transferred at a fast speed, which is beneficial to improving the overall speed of the read operation.

Another example of the present application provides a method for operating a memory system, including: obtaining a first state corresponding to at least one of the code words at a target read voltage; the first state includes a state which is to represent a relationship of size between the number of bits in the at least one of the code words which are flipped in two results of reading at the first read voltage and the second read voltage and a first preset value; the difference between the first read voltage and the second read voltage is less than a preset voltage; the memory system including at least one memory device, the memory device including a plurality of memory cells, a preset number of the memory cells forming a code word; performing multiple adjustments to the target read voltage, and obtaining a first state corresponding to the at least one of the code words at the read voltage after each of the adjustments respectively; determining a valley voltage in accordance with a variation trend of the relationship of size between the number of flipped bits and the first preset value indicated by a plurality of the obtained first states; the valley voltage is to be a read voltage for performing a read operation on the at least one of the code words.

In some examples, the method further includes: sending a second instruction before performing a read operation on data stored in the memory device, the second instruction indicating to obtain a plurality of first states corresponding to the code word at the multiple different read voltages; determining a valley voltage with the plurality of first states respectively corresponding to multiple different read voltages; and performing a read operation on data stored in the memory device with the valley voltage.

In some examples, the data amount of the first state is less than the preset threshold of data amount, e.g., the data amount of the first state ranges from 1 byte to 4 byte, therefore, in the process of determining the valley voltage, the amount of data transferred between the memory device and the memory controller is small and the data is transferred at a fast speed, which is beneficial to improving the overall speed of the read operation.

In some examples, the method further includes: reading data stored in the at least one of the code words at the target read voltage to obtain a first result; performing a first adjustment to the target read voltage and read data stored in the at least one of the code words at the adjusted target read voltage to obtain a second result; performing a logical operation on the first result and the second result to obtain a third result; comparing the number of bits in the third result that represent flip of bits in the second result relative to the first result and a first preset value to obtain a first state.

Another example of the present application provides a memory device, as shown in FIG. 5, the memory device includes: an array of memory cells 301, including a plurality of memory cells, a preset number of the memory cells forming a code word; peripheral circuit coupled to the array of memory cells 301, including control logic 512 and a page buffer 504; the control logic 512 is configured to: read data stored in the at least one of the code words at a first read voltage to obtain a first result, and store the first result in the first latch of the page buffer; adjust the first read voltage to obtain a second read voltage, read data stored in the at least one of the code words at the second read voltage to obtain a second result, and store the second result in the second latch of the page buffer; the difference between the first read voltage and the second read voltage is less than a preset voltage; perform a logical operation on the first result and the second result to obtain a third result, and store the third result in the third latch of the page buffer; compare the number of bits in the third result that represent flip of bits in the second result relative to the first result and a first preset value to obtain a first state; the first state includes a state which is to represent a relationship of size between the number of bits in the at least one of the code words which are flipped in two results of reading at the first read voltage and the second read voltage and a first preset value.

Another example of the present application provides a method for operating a memory device, the memory device includes an array of memory cells and a page buffer, the array of memory cells including a plurality of memory cells, a preset number of the memory cells forming a code word; the method including: reading data stored in at least one of the code words at a first read voltage to obtain a first result, and storing the first result in the first latch of the page buffer; adjusting the target read voltage to obtain a second read voltage, reading data stored in the at least one of the code words at the second read voltage to obtain a second result, and storing the second result in the second latch of the page buffer; the difference between the first read voltage and the second read voltage is less than a preset voltage; performing a logical operation on the first result and the second result to obtain a third result, and storing the third result in the third latch of the page buffer; comparing the number of bits in the third result that represent flip of bits in the second result relative to the first result and a first preset value to obtain a first state, the first state includes a state which is to represent a relationship of size between the number of bits in the at least one of the code words which are flipped in two results of reading at the first read voltage and the second read voltage and a first preset value.

In this and the previous example, the difference between the first read voltage and the second read voltage being less than the preset voltage may be understood that there is a smaller voltage difference between the first read voltage and the second read voltage. In some examples, the range of the preset voltage is set to 6 mV to 21 mV, in some examples, the preset voltage may be 6 mV, 11 mV, 16 mV, and 21 mV. The first preset value may be obtained in accordance with historical data; the first preset value is less than the an upper limit of the fail bit count (FBC) supported by the memory device.

It should be noted that the first state here, or the acquisition process for the relationship of size between the FBC between read voltages with two voltage differences being close and a first preset value may be packaged inside the memory device and accelerated through the page buffer in the memory device.

It should be noted that the concepts mentioned in this and the previous example that are the same as those in the examples described above may be understood with reference to the description in the examples described above, and will not be repeated here. In addition, in this and the previous example, the last obtained first state may also be used for many scenarios other than determining the valley voltage described above. For example, the scenario of determining the offset of a memory cell in a memory device.

Figure 16:
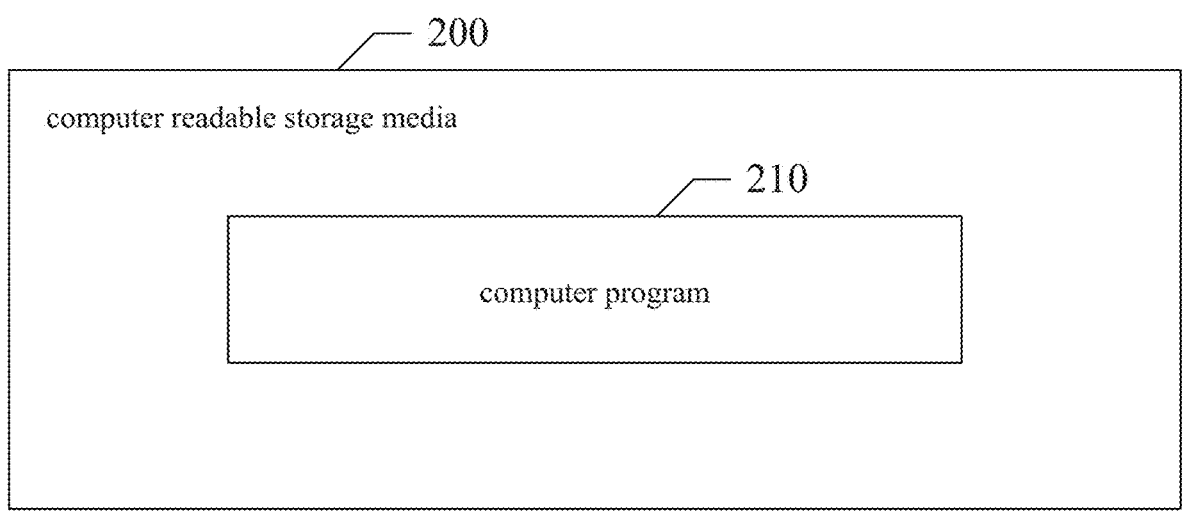
FIG. 16 is a block diagram of a computer readable storage medium provided by an example of the present application.

Referring to FIG. 16, FIG. 16 is a block diagram of a computer readable storage medium provided by an example of the present application. As shown in FIG. 16, an example of the present disclosure provides a computer readable storage medium, the computer readable storage medium 200 stores computer program 210 that when executed by a processor, may implement the method for operating a memory system of the technical schemes described above. The method includes: obtaining a first state corresponding to at least one of the code words at a target read voltage; the first state is to represent a relationship of size between the number of bits in the at least one of the code words which are flipped in two results of reading at the first read voltage and the second read voltage and a first preset value; the difference between the first read voltage and the second read voltage is less than a preset voltage; the memory system including at least one memory device, the memory device including a plurality of memory cells, a preset number of the memory cells forming a code word; performing multiple adjustments to the target read voltage, and obtaining a first state corresponding to the at least one of the code words at the read voltage after each of the adjustments respectively; determine a valley voltage in accordance with a variation trend of the relationship of size between the number of flipped bits and the first preset value indicated by a plurality of the obtained first states; the valley voltage is to be a read voltage for performing a read operation on the at least one of the code words.

It should be understood that reference throughout the description to "one example" or "an example" means that a particular feature, structure or characteristic related to the example is included in at least one example of the present application. Thus, appearances of "in one example" or "in an example" in various places throughout the description are not necessarily referring to a same example. Furthermore, these particular features, structures or characteristics may be combined in any appropriate manner in one or more examples. It should be understood that in various examples of the present application, sequence numbers of the processes described above do not mean the performing order, and the performing order of each process should be determined by its function and internal logic, and should not constitute any limitation to implementation process of examples of the present application. The serial numbers of examples of the present application described above are for the purpose of description only, and do not represent the advantages and disadvantages of the examples.

The above is only a preferred example of the present application, and does not limit the patent scope of the present application, and under the inventive concept of the present application, any equivalent structural transformation made by using content of the present application and the accompanying drawings, or direct/indirect application in other related technical fields are included in the patent protection scope of the present application.

The memory device and operating method thereof, the memory system and operating method thereof provided by the examples of the present application are able to effectively avoid the problems of long time consumption and incomplete scene coverage caused by using the retry table, and to save the space occupied by the retry table, find the valley voltage more quickly and accurately, thereby effectively reducing the time delay in determining the valley voltage. Meanwhile performing read operations at the obtained valley voltage greatly increases the probability of correctly reading the storage data, thus improving product reliability and user experience.

What is claimed is:

1. A memory device, comprising:
    an array of memory cells, including a plurality of memory cells; wherein a preset number of the memory cells forms a code word; and
    a peripheral circuit coupled to the array of memory cells and configured to:
        obtain a first state corresponding to at least one of the code words at a target read voltage; wherein the first state includes a state that represents a relationship of size between a number of bits in the at least one of the code words which are flipped in two results of reading at a first read voltage and a second read voltage and a first preset value; and wherein a difference between the first read voltage and the second read voltage is less than a preset voltage;
        read data stored in at least one of the code words at the target read voltage to obtain a first result;
        perform a first adjustment to the target read voltage and read data stored in at least one of the code words at an adjusted target read voltage to obtain a second result;
        perform a logical operation on the first result and the second result to obtain a third result;
        compare the number of bits in the third result that represent flip of bits in the second result relative to the first result and the first preset value to obtain a first state; and
        determine a valley voltage in accordance with a variation trend of the relationship of size between the number of flipped bits and the first preset value indicated by the first state; wherein the valley voltage is a read voltage for performing a read operation on the at least one of the code words.

2. The memory device of claim 1, wherein the peripheral circuit includes:
    a first latch configured to store the first result;
    a second latch configured to store the second result; and
    a third latch configured to store the third result.

3. The memory device of claim 1, wherein:
    when the number of bits in the third result that represent flip of bits in the second result relative to the first result is greater than the first preset value, the first state is a failed state; and
    when the number of bits in the third result that represent flip of bits in the second result relative to the first result is less than or equal to the first preset value, the first state is a pass state.

4. The memory device of claim 3, wherein the peripheral circuit is configured to:
    when multiple adjustments are performed to the target read voltage, perform a second adjustment to the read voltage after a previous adjustment for each of the multiple adjustments; wherein a step size of the second adjustment is greater than that of the first adjustment; and wherein the step size of the second adjustment is a fixed value; and
    when multiple adjustments are performed to the target read voltage, if a change from a failed state to at least one pass state and then to a failed state again is indicated by a plurality of the first states corresponding to the read voltages after multiple adjustments, stop adjusting the read voltage.

5. The memory device of claim 4, wherein:
when a number of pass states between the failed states at two ends indicated by a plurality of first states corresponding to adjusted read voltages include one, an adjusted read voltage corresponding to the one pass state is the valley voltage;
when the number of pass states between the failed states at two ends indicated by the plurality of first states corresponding to the adjusted read voltages include more than one, the adjusted read voltage corresponding to one pass state at a middle position among the more than one pass states is the valley voltage; and
when the number of pass states between the failed states at two ends indicated by the plurality of first states corresponding to the adjusted read voltages includes an even number, an average of the adjusted read voltages corresponding to two pass states at a middle position among the plurality of the pass states is the valley voltage.

6. The memory device of claim 4, wherein the peripheral circuit is configured to:
after a first pass state after failed states occurs among a plurality of first states corresponding to the read voltages after multiple adjustments, perform a third adjustment to the read voltage after a previous adjustment; wherein the step size of the third adjustment is less than that of the second adjustment.

7. The memory device of claim 6, wherein the peripheral circuit is configured to:
maintain the third adjustment until a first failed state after pass states occurs among the plurality of first states; and
after the first failed state after pass states occurs among the plurality of first states, perform the second adjustment to the read voltage after a previous adjustment.

8. The memory device of claim 4, wherein the peripheral circuit is configured to:
after a first pass state after failed states occurs among a plurality of first states corresponding to the read voltages after multiple adjustments, perform a fourth adjustment to the read voltage after a previous adjustment in accordance with the third result corresponding to the first pass state.

9. The memory device of claim 4, wherein the peripheral circuit is configured to:
when a plurality of first states corresponding to the read voltages after multiple adjustments are all failed states, increase the step size corresponding to the second adjustment; and
when an increased step size of the second adjustment exceeds a second preset value, adjust a number of memory cells corresponding to at least one of the code words; wherein the number of memory cells corresponding to the code word after adjustment is less than the number of memory cells corresponding to the code word before adjustment.

10. The memory device of claim 1, wherein the peripheral circuit is configured to:
obtain the first preset value; wherein the first preset value is obtained in accordance with historical data and less than an upper limit of a fail bit count supported by the memory device.

11. The memory device of claim 1, wherein the peripheral circuit is configured to:
before obtaining the first state corresponding to at least one of the code words at the target read voltage, set a read mode of the memory device to a single level read mode; wherein the single level read mode includes reading at least one bit of storage data stored in the memory cell with read voltages at one level.

12. The memory device of claim 11, wherein:
the memory cell includes M bits, the memory device includes M-type pages, and the memory cell with M bits reads its M bits of storage data with read voltages at N levels;
the M and N are both integers greater than 1, and $N=2^M-1$; and
the peripheral circuit is configured to:
for read voltages at each level of the read voltages at multiple levels corresponding to each type of page, determine the valley voltage at each level in accordance with a plurality of first states corresponding to multiple read voltages at each level.

13. The memory device of claim 1, wherein the first state is a pass state or a failed state.

14. A memory system, comprising:
one or more memory devices, comprising:
an array of memory cells; wherein the array of memory cells includes a plurality of memory cells; and wherein a preset number of the memory cells forms a code word;
a peripheral circuit coupled to the array of memory cells and configured to:
obtain a first state corresponding to at least one of the code words at a target read voltage; wherein the first state includes a state that represents a relationship of size between a number of bits in the at least one of the code words which are flipped in two results of reading at a first read voltage and a second read voltage and a first preset value; and wherein a difference between the first read voltage and the second read voltage is less than a preset voltage;
read data stored in at least one of the code words at the target read voltage to obtain a first result;
perform a first adjustment to the target read voltage and read data stored in at least one of the code words at an adjusted target read voltage to obtain a second result;
perform a logical operation on the first result and the second result to obtain a third result;
compare the number of bits in the third result that represent flip of bits in the second result relative to the first result and the first preset value to obtain a first state; and
determine a valley voltage in accordance with a variation trend of the relationship of size between the number of flipped bits and the first preset value indicated by the first state; wherein the valley voltage is a read voltage for performing a read operation on the at least one of the code words; and
a memory controller coupled to the memory device and controlling the memory device.

15. The memory system of claim 14, wherein:
the memory controller is configured to:
send a first instruction before performing a read operation on data stored in the memory device; wherein the first instruction indicates to obtain a valley voltage;
the memory device is configured to:
receive the first instruction, and obtain a valley voltage; and
send the obtained valley voltage to the memory controller; and
the memory controller is further configured to:

perform a read operation on data stored in the memory device with the valley voltage; and perform an error correction code decoding operation on a read result of the read operation.

16. A method for operating a memory device, comprising:

obtaining a first state corresponding to at least one code word at a target read voltage; wherein the first state includes a state that represents a relationship of size between a number of bits in the at least one of the code words which are flipped in two results of reading at a first read voltage and a second read voltage and a first preset value; a difference between the first read voltage and the second read voltage is less than a preset voltage; wherein the memory device includes an array of memory cells; wherein the array of memory cells includes a plurality of memory cells; and wherein a preset number of the memory cells forms a code word;

reading data stored in at least one of the code words at the target read voltage to obtain a first result;

performing a first adjustment to the target read voltage and reading data stored in at least one of the code words at an adjusted target read voltage to obtain a second result;

performing a logical operation on the first result and the second result to obtain a third result;

comparing the number of bits in the third result that represent flip of bits in the second result relative to the first result and the first preset value to obtain a first state; and determining a valley voltage in accordance with a variation trend of the relationship of size between the number of flipped bits and the first preset value indicated by the first state; wherein the valley voltage is to be a read voltage for performing a read operation on the at least one of the code words.

17. The method of claim 16, further comprising:
storing the first result in a first latch of the memory device;
storing the second result in a second latch of the memory device; and
storing the third result in a third latch of the memory device.

18. The method of claim 16, wherein:
when the number of bits in the third result that represent flip of bits in the second result relative to the first result is greater than the first preset value, the first state is a failed state; and
when the number of bits in the third result that represent flip of bits in the second result relative to the first result is less than or equal to the first preset value, the first state is a pass state.

19. The method of claim 18, further comprising:
when multiple adjustments are performed to the target read voltage, performing a second adjustment to the read voltage after a previous adjustment for each of the multiple adjustments; wherein a step size of the second adjustment is greater than that of the first adjustment; and wherein the step size of the second adjustment is a fixed value; and
when multiple adjustments are performed to the target read voltage, if a change from a failed state to at least one pass state and then to a failed state again is indicated by a plurality of first states corresponding to the read voltages after multiple adjustments, stopping adjusting the read voltage.

20. The method of claim 16, wherein the first state is a pass state or a failed state.

* * * * *